United States Patent
Kitanaka et al.

(10) Patent No.: US 9,520,733 B2
(45) Date of Patent: Dec. 13, 2016

(54) CHARGING AND DISCHARGING DEVICE TO INCREASE BATTERY TEMPERATURE BY CONTROLLING RIPPLE CURRENT

(75) Inventors: Hidetoshi Kitanaka, Chiyoda-ku (JP); Shoji Yoshioka, Chiyoda-ku (JP); Keita Hatanaka, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 282 days.

(21) Appl. No.: 13/978,426

(22) PCT Filed: Jan. 7, 2011

(86) PCT No.: PCT/JP2011/050205
§ 371 (c)(1),
(2), (4) Date: Jul. 5, 2013

(87) PCT Pub. No.: WO2012/093493
PCT Pub. Date: Jul. 12, 2012

(65) Prior Publication Data
US 2013/0271084 A1    Oct. 17, 2013

(51) Int. Cl.
*B60L 11/18* (2006.01)
*H02J 7/00* (2006.01)
(Continued)

(52) U.S. Cl.
CPC ............. *H02J 7/0068* (2013.01); *B60L 3/003* (2013.01); *B60L 3/0046* (2013.01); *B60L 9/00* (2013.01);
(Continued)

(58) Field of Classification Search
CPC ..... B60L 11/005; B60L 11/14; B60L 11/1872; B60L 11/1861; B60L 3/003; B60L 3/0046; B60L 9/00; H02J 7/0068; H01M 10/44
(Continued)

(56) References Cited

U.S. PATENT DOCUMENTS 2,442,380 A * 6/1948 Schrodt et al. ............... 219/200
2,679,549 A * 5/1954 Rezek et al. .................. 219/202
(Continued)

FOREIGN PATENT DOCUMENTS

CN    1436395 A    8/2003
EP    1286459 A1    2/2003
(Continued)

OTHER PUBLICATIONS

"Introduction to Pulse Width Modulation," Michael Barr, Embedded.com, Published Aug. 31, 2001, Accessed Jul. 13, 2015, http://www.embedded.com/electronics-blogs/beginner-s-corner/4023833/Introduction-to-Pulse-Width-Modulation.*
(Continued)

*Primary Examiner* — Robert Grant
*Assistant Examiner* — John Trischler
(74) *Attorney, Agent, or Firm* — Buchanan Ingersoll & Rooney PC

(57) ABSTRACT

A charging and discharging device includes a switching circuit, an input of which is connected to a power supply, the switching circuit adjusting an output current IB to a power storing unit connected to an output of the switching circuit, and a control unit configured to generate an ON/OFF signal DGC to the switching circuit. The control unit includes a temperature-rise control unit configured to separately generate, based on a signal BTMP equivalent to the temperature of the power storing unit, a control signal FC for adjusting
(Continued)

a ripple component of the output current IB and a control signal OFS for adjusting a non-ripple component of the output current IB and generates the ON/OFF signal DGC based on the control signal FC and the control signal OFS and outputs the ON/OFF signal DGC to the switching circuit.

19 Claims, 14 Drawing Sheets

(51) Int. Cl.
| | |
|---|---|
| B60L 3/00 | (2006.01) |
| B60L 9/00 | (2006.01) |
| H01M 10/44 | (2006.01) |
| B60L 11/14 | (2006.01) |
| B60L 11/00 | (2006.01) |
| H01M 10/052 | (2010.01) |
| H01M 10/30 | (2006.01) |
| H01M 10/34 | (2006.01) |

(52) U.S. Cl.
CPC ........... *B60L 11/005* (2013.01); *B60L 11/14* (2013.01); *B60L 11/1861* (2013.01); *B60L 11/1872* (2013.01); *H01M 10/44* (2013.01); *B60L 2240/12* (2013.01); *B60L 2240/529* (2013.01); *B60L 2240/545* (2013.01); *B60L 2270/142* (2013.01); *H01M 10/052* (2013.01); *H01M 10/30* (2013.01); *H01M 10/345* (2013.01); *H01M 2220/20* (2013.01); *Y02T 10/70* (2013.01); *Y02T 10/7005* (2013.01); *Y02T 10/705* (2013.01); *Y02T 10/7011* (2013.01); *Y02T 10/7022* (2013.01); *Y02T 10/7044* (2013.01); *Y02T 10/7077* (2013.01)

(58) Field of Classification Search
USPC ........ 320/129, 167, 152, 136, 144; 219/202, 219/209
See application file for complete search history.

(56) References Cited

U.S. PATENT DOCUMENTS

| | | | | |
|---|---|---|---|---|
| 2,710,937 | A * | 6/1955 | Godshalk et al. | 320/118 |
| 4,222,000 | A * | 9/1980 | Silvertown et al. | 322/33 |
| 4,548,121 | A * | 10/1985 | Janssen et al. | 89/26 |
| 5,311,112 | A * | 5/1994 | Creaco et al. | 320/119 |
| 5,362,942 | A * | 11/1994 | Vanderslice et al. | 219/209 |
| 5,508,126 | A * | 4/1996 | Braun | 429/7 |
| 5,600,227 | A * | 2/1997 | Smalley | 320/129 |
| 5,659,237 | A * | 8/1997 | Divan et al. | 320/119 |
| 5,663,876 | A * | 9/1997 | Newton et al. | 363/126 |
| 5,710,507 | A * | 1/1998 | Rosenbluth et al. | 307/66 |
| 5,834,131 | A * | 11/1998 | Lutz et al. | 429/7 |
| 5,928,551 | A * | 7/1999 | Okabayashi | 219/663 |
| 5,990,660 | A * | 11/1999 | Meissner | 320/127 |
| 5,990,661 | A * | 11/1999 | Ashtiani et al. | 320/128 |
| 6,002,240 | A * | 12/1999 | McMahan et al. | 320/150 |
| 6,054,842 | A * | 4/2000 | Verzwyvelt et al. | 320/135 |
| 6,078,163 | A * | 6/2000 | Horie et al. | 320/104 |
| 6,160,379 | A * | 12/2000 | Chalasani et al. | 320/119 |
| 6,163,135 | A * | 12/2000 | Nakayama et al. | 320/150 |
| 6,271,648 | B1 * | 8/2001 | Miller | 320/150 |
| 6,340,879 | B1 * | 1/2002 | Blacker | 320/153 |
| 6,509,718 | B2 * | 1/2003 | Sakai et al. | 320/134 |
| 6,677,725 | B2 * | 1/2004 | Tamai et al. | 320/103 |
| 6,882,061 | B1 * | 4/2005 | Ashtiani et al. | 307/10.7 |
| 7,120,037 | B2 * | 10/2006 | Komatsu et al. | 363/37 |
| 7,327,122 | B2 * | 2/2008 | Kamenoff | 320/150 |
| 7,382,102 | B2 * | 6/2008 | Ashtiani | 318/139 |
| 7,409,276 | B2 * | 8/2008 | Nishina et al. | 701/36 |
| 7,479,761 | B2 * | 1/2009 | Okumura | 320/132 |
| 7,570,011 | B2 * | 8/2009 | Waikar et al. | 320/104 |
| 7,629,755 | B2 * | 12/2009 | Yaguchi | 318/139 |
| 7,692,940 | B2 * | 4/2010 | Ochiai et al. | 363/98 |
| 8,027,181 | B2 * | 9/2011 | Hamatani | 363/98 |
| 8,143,741 | B2 * | 3/2012 | Funakoshi et al. | 307/10.8 |
| 8,248,033 | B2 * | 8/2012 | Nishi et al. | 320/132 |
| 8,258,742 | B2 * | 9/2012 | Funakoshi | 320/104 |
| 8,268,465 | B2 * | 9/2012 | Nollet | 429/50 |
| 8,280,572 | B2 * | 10/2012 | Takahashi et al. | 701/22 |
| 8,305,043 | B2 * | 11/2012 | Yamamoto et al. | 320/150 |
| 8,339,104 | B2 * | 12/2012 | Tamura | 320/136 |
| 8,452,490 | B2 * | 5/2013 | Lakirovich et al. | 701/36 |
| 8,579,059 | B2 * | 11/2013 | Teraya | 180/65.265 |
| 8,750,008 | B2 * | 6/2014 | Sugiyama et al. | 363/131 |
| 8,766,566 | B2 * | 7/2014 | Baba et al. | 318/139 |
| 8,816,634 | B2 * | 8/2014 | Xu et al. | 320/107 |
| 2002/0011822 | A1 * | 1/2002 | Sakai et al. | 320/134 |
| 2003/0057914 | A1 * | 3/2003 | Kamatsu et al. | 318/727 |
| 2007/0018608 | A1 * | 1/2007 | Okumura | 320/104 |
| 2007/0175429 | A1 | 8/2007 | Yanagida et al. | |
| 2009/0067202 | A1 * | 3/2009 | Ichikawa et al. | 363/79 |
| 2009/0251103 | A1 * | 10/2009 | Yamamoto et al. | 320/133 |
| 2010/0019728 | A1 * | 1/2010 | Ichikawa et al. | 320/134 |
| 2010/0085019 | A1 | 4/2010 | Masuda | |
| 2010/0100266 | A1 * | 4/2010 | Yoshinori et al. | 701/22 |
| 2010/0270976 | A1 * | 10/2010 | Tamura | 320/136 |
| 2012/0021263 | A1 * | 1/2012 | Nishi et al. | 429/62 |
| 2012/0112695 | A1 * | 5/2012 | Nishi et al. | 320/109 |
| 2012/0123626 | A1 * | 5/2012 | Takahashil et al. | 701/22 |
| 2012/0200263 | A1 | 8/2012 | Masuda | |
| 2013/0063122 | A1 * | 3/2013 | Martaeng | H02M 1/15 323/312 |
| 2014/0062409 | A1 * | 3/2014 | Endo et al. | 320/126 |
| 2014/0126250 | A1 * | 5/2014 | Lan et al. | 363/21.17 |

FOREIGN PATENT DOCUMENTS

| | | | | |
|---|---|---|---|---|
| JP | 06076934 A | * | 3/1994 | ............. H05B 6/66 |
| JP | 2006-006073 A | | 1/2006 | |
| JP | 2006006073 A | * | 1/2006 | |
| JP | 2006-092901 A | | 4/2006 | |
| JP | 2007-012568 A | | 1/2007 | |
| JP | 2007-028702 A | | 2/2007 | |
| JP | 2008-148408 A | | 6/2008 | |
| JP | 2008-302763 A | | 12/2008 | |
| JP | 2010-093969 A | | 4/2010 | |
| JP | 2010-124634 A | | 6/2010 | |
| JP | 2010-257722 A | | 11/2010 | |
| JP | 2010-259217 A | | 11/2010 | |
| JP | 2010-272395 A | | 12/2010 | |

OTHER PUBLICATIONS

European Search Report dated Jul. 18, 2014 issued in corresponding European Patent Appln. No. 11855015.1 (11 pages).
International Search Report (PCT/ISA/210) issued on Jun. 28, 2011, by the Japanese Patent Office as the International Searching Authority for International Application No. PCT/JP2011/050205.
Written Opinion (PCT/ISA/237) issued on Jun. 28, 2011, by the Japanese Patent Office as the International Searching Authority for International Application No. PCT/JP2011/050205.
Office Action issued on Feb. 28, 2015, by the Chinese Patent Office in corresponding Chinese Patent Application No. 201180069063.7 and an English translation of the Office Action. (23 pages).
European Search Report issued by the European Patent Office on May 23, 2016 in corresponding European Application No. 11855015.1 (6 pages).

* cited by examiner (a) WHEN IBR-SW1=0 AND SW0=0

(b) WHEN IBR-SW1≠0 AND SW0≠0

CHARGING AND DISCHARGING DEVICE TO INCREASE BATTERY TEMPERATURE BY CONTROLLING RIPPLE CURRENT

FIELD

The present invention relates to a charging and discharging device that performs charging and discharging of a power storing unit including a power storage element such as a secondary battery or an electric double layer capacitor.

BACKGROUND

In general, the performance of a power storage element such as a secondary battery or an electric double layer capacitor represented by a nickel hydrogen battery and a lithium ion battery is deteriorated as temperature falls because, for example, electric resistance in the power storage element increases. In an example of a certain power storage element, internal resistance under a condition of 0° C. is about five times as large as internal resistance under a condition of 25° C. When the internal resistance increases, a loss due to charging and discharging currents increases and the efficiency of a system is deteriorated. Controllability is deteriorated because a voltage change, which is a product of the internal resistance and the charging and discharging currents, increases. When charging and discharging are performed with the same electric current, under a low temperature condition, it is likely that a voltage across the power storage element greatly fluctuates and exceeds an allowable upper limit voltage and a lower limit voltage of the power storage element and the charging and discharging device. In particular, when charging is performed under a low temperature condition lower than 0° C., substantial deterioration and damage of the power storage element are caused, the charging currents have to be suppressed or charging itself has to be stopped.

In recent years, the development of a system in which a power storage element is mounted on an electric vehicle, regenerative energy during braking is stored in the power storage element, and the energy is reused during power running and acceleration has been underway. In such a system, the power storage element needs to secure sufficient performance under a low temperature environment.

In general, devices of an electric vehicle are designed to be capable of performing normal operation at about minus 25° C. However, currently, there is no power storage element that can exhibit sufficient performance in such a low temperature environment.

Therefore, as a method of securing the performance of the power storage element during low temperature, a configuration has also been examined in which, when the temperature of the power storage element is low, a switching frequency of a chopper circuit connected to the power storage element is reduced to increase a ripple current and heat the power storage element (Patent Literature 1).

CITATION LIST

Patent Literature

Patent Literature 1: Japanese Patent Application Laid-open No. 2006-006073

SUMMARY

Technical Problem

However, when the method of reducing the switching frequency to increase the ripple current and heat the power storage element is realized, there are mainly problems explained below.

It is likely that a voltage ripple of the power storage element also increases according to the increase in the ripple current and the voltage of the power storage element exceeds an upper limit value or falls below a lower limit value to damage the power storage element.

Because the magnitude of an output current of the chopper circuit increases by the increase in the ripple current, it is likely that the output current exceeds an allowable maximum current of a switching element included in the chopper circuit to damage the switching element.

Noise from components of the chopper circuit increases according to the increase in the ripple current.

Because the switching frequency needs to be changed, the frequency of electromagnetic noise from the components of the chopper circuit fluctuates to cause harsh noise.

The present invention has been devised to solve the problems and it is an object of the present invention to obtain a charging and discharging device that can efficiently raise the temperature of a power storing unit including a power storage element such as a secondary battery or an electric double layer capacitor.

Solution to Problem

In order to solve the aforementioned problems, a charging and discharging device according to one aspect of the present invention has been constructed in such a manner as to include: a switching circuit, an input of which is connected to a power supply, the switching circuit adjusting an output current to a power storing unit connected to an output of the switching circuit; and a control unit configured to generate an ON/OFF signal to the switching circuit, wherein the control unit includes a temperature-rise control unit configured to separately generate, based on a signal equivalent to temperature of the power storing unit, a first control signal for adjusting a ripple component of the output current and a second control signal for adjusting a non-ripple component of the output current, the control unit generating the ON/OFF signal based on the first control signal and the second control signal and outputting the ON/OFF signal to the switching circuit.

Advantageous Effects of Invention

According to the present invention, there is an effect that it is possible to efficiently raise the temperature of a power storing unit including a power storage element such as a secondary battery or an electric double layer capacitor.

DESCRIPTION OF EMBODIMENTS

Embodiments of a charging and discharging device according to the present invention are explained in detail below based on the drawings. The present invention is not limited by the embodiments.

First Embodiment

Figure 1:
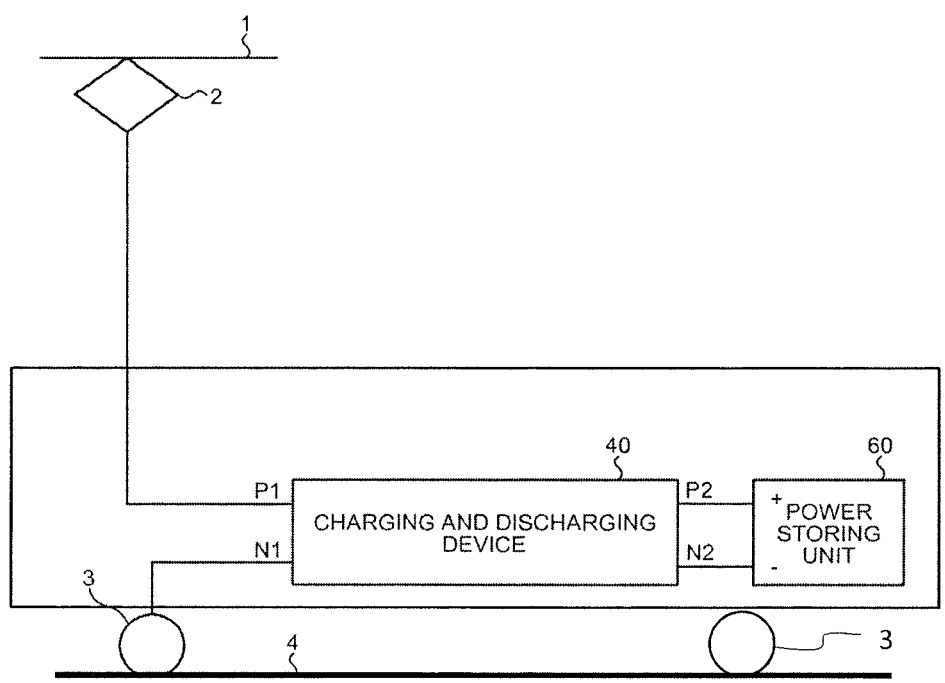
FIG. 1 is a diagram of a configuration example of a system including a charging and discharging device in a first embodiment of the present invention.

FIG. 1 is a diagram of a configuration example of a system including a charging and discharging device 40 in a first embodiment of the present invention. An example in which the system including the charging and discharging device 40 is applied to an electric vehicle is shown. As shown in FIG. 1, electric power from a not-shown electric power substation is input to a positive-side input terminal P1 of the charging and discharging device 40 from an overhead line 1 via a current collecting device 2. A negative-side current from the charging and discharging device 40 is fed through a negative-side input terminal N1 and connected to a rail 4 via a wheel 3 and returns to a negative side of the not-shown electric power substation.

Direct-current output terminals P2 and N2 are provided in the charging and discharging device 40. A power storing unit 60 is connected to the direct-current output terminals P2 and N2. The power storing unit 60 is configured by connecting a plurality of power storage elements such as secondary batteries or electric double layer capacitors in parallel to obtain desired voltage and capacity. Because a specific configuration of the power storing unit 60 is publicly-known, detailed explanation of the configuration is omitted.

The charging and discharging device 40 is a power converting device for adjusting a power flow between a power supply and the power storing unit 60 and charging or discharging the power storing unit 60.

The electric vehicle assumed herein includes a motor and a motor driving device not shown in the figure. For example, during power running and acceleration, the motor is driven using electric power of the power storing unit 60 to drive the electric vehicle. During braking of the electric vehicle, regenerative power from the motor is charged in the power storing unit 60 to attain effective use of energy.

Figure 2:
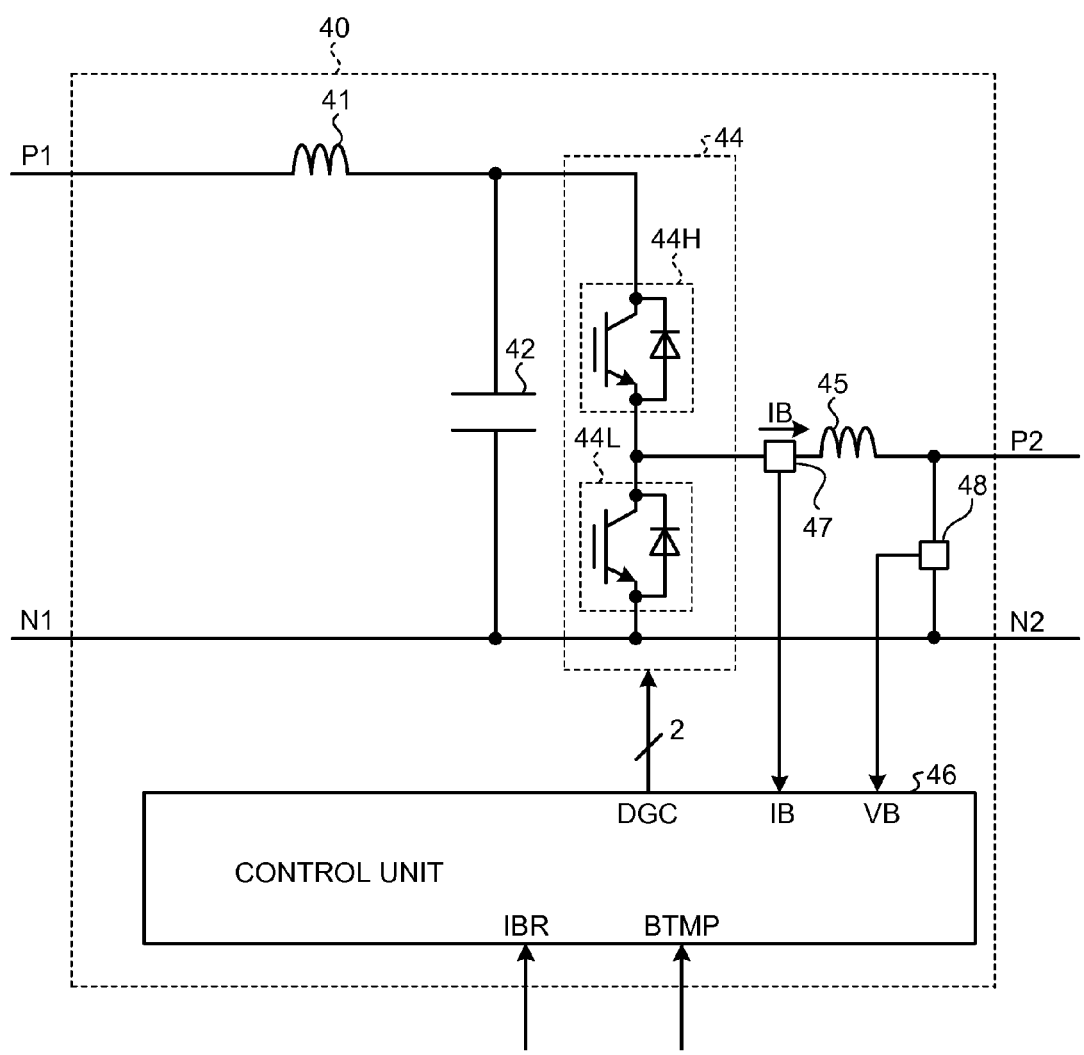
FIG. 2 is a diagram of a configuration example of the charging and discharging device in the first embodiment of the present invention.

The configuration of the charging and discharging device 40 is explained. FIG. 2 is a diagram of a configuration example of the charging and discharging device 40 in the first embodiment of the present invention. As shown in FIG. 2, electric power from the current collecting device 2 is input to the input terminals P1 and N1. A reactor 41 is connected to the positive-side input terminal P1. A filter capacitor 42 is connected to the post stage of the reactor 41. An LC filter circuit including the reactor 41 and the filter capacitor 42 suppresses an outflow of a noise current caused by a switching operation of a switching element explained later to the overhead line 1 and smoothes a ripple component included in the voltage of the overhead line 1 (an overhead line voltage) to smooth the voltage across the filter capacitor 42.

A switching circuit 44 is connected to both the ends of the filter capacitor 42. The switching circuit 44 includes switching elements 44H and 44L. The respective switching elements are subjected to ON/OFF control (switching control) by an ON/OFF signal DGC from the control unit 46. The switching circuit 44 is a so-called bidirectional step-down chopper circuit. The switching circuit 44 has a step-down function for stepping down the voltage of the filter capacitor 42 according to the switching control of the switching elements 44H and 44L and outputting the voltage and a current control function for adjusting an output current as desired. Because a circuit configuration and operation of the switching circuit 44 are publicly known, explanation of the circuit configuration and the operation is omitted.

A current detector 47 configured to detect an output current IB and output the output current IB to the control unit 46, a smoothing reactor 45 configured to smooth an electric current, and a voltage detector 48 configured to detect a post-stage voltage of the smoothing reactor 45 (i.e., the voltage of the power storing unit 60) and output the post-stage voltage to the control unit 46 as an output voltage VB are provided in the output of the switching circuit 44.

A signal IBR, which is a target value (a command value) of the output current IB, and a signal BTMP equivalent to the temperature of the inside of the power storing unit 60 are input to the charging and discharging device 40 from an external system. The control unit 46 generates the ON/OFF signal DGC to the switching circuit 44 based on these input signals.

Figure 3:
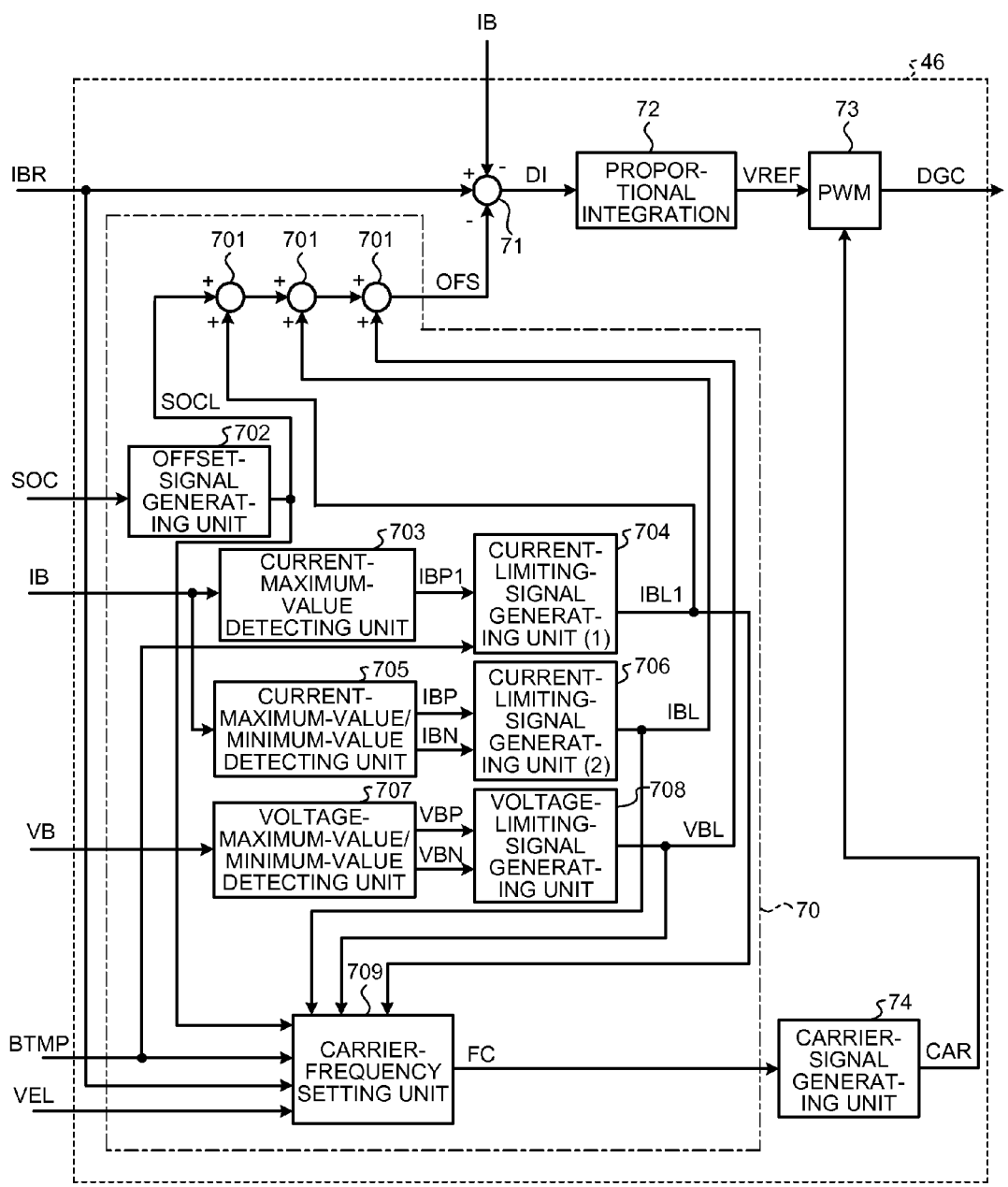
FIG. 3 is a diagram of a configuration example of a control unit in the first embodiment of the present invention.

The configuration of the control unit 46 is explained. FIG. 3 is a diagram of a configuration example of the control unit 46 in the first embodiment of the present invention. As shown in FIG. 3, the control unit 46 includes an adder-subtracter 71, a proportional integration controller 72, a PWM-pulse generating unit 73, a carrier-signal generating unit 74, and a temperature-rise control unit 70.

The signal IBR, which is an output current target value, is input to the adder-subtracter 71. The signal IBR is a target value of an electric current for charging and discharging a predetermined electric current in and from the power storing unit 60 to, for example, extract, from the power storing unit 60, electric power necessary when the electric vehicle performs power run and charge, in the power storing unit 60, regenerative power generated when the electric vehicle brakes.

The adder-subtracter 71 subtracts a signal IB, which is a detected value of the output current, from the signal IBR and further subtracts a signal (a second control signal) OFS, which is an output signal of the temperature-rise control unit 70, from the signal IBR to generate a signal DI. The temperature-rise control unit 70 is explained below.

The signal DI is input to the proportional integration controller 72, and a signal VREF subjected to proportional integration processing therein is output. The signal VREF is input to the PWM-pulse generating unit 73. The PWM-pulse generating unit 73 performs comparison of the signal VREF and a carrier signal CAR. When VREF>CAR, the PWM-pulse generating unit 73 outputs the signal DGC for turning on the switching element 44H and turning off the switching element 44L. When VREF<CAR, the PWM-pulse generating unit 73 outputs the signal DGC for turning on the switching element 44L and turning off the switching element 44H. Such a method of generating a PWM pulse is publicly known. The carrier signal CAR is a carrier wave having a triangular wave shape or a saw tooth wave shape. The generation method is explained below.

When the signal OFS is not taken into account, the components explained above operate to generate the signal DGC for matching a detected value IB of an output current with the signal IBR, which is the target value of the output current.

The configuration of the temperature-rise control unit 70, which is a central part of the present invention, is explained. The temperature-rise control unit 70 includes adders 701, an offset-signal generating unit 702, a current-maximum-value detecting unit 703, a current-limiting-signal generating unit (1: a first current-limiting-signal generating unit) 704, a current-maximum-value/minimum-value detecting unit 705, a current-limiting-signal generating unit (2: a second current-limiting-signal generating unit) 706, a voltage-maximum-value/minimum-value detecting unit 707, a voltage-limiting-signal generating unit 708, and a carrier-frequency setting unit 709.

The signal BTMP, which is a signal equivalent to the temperature of the power storing unit 60, a signal VEL equivalent to the speed of the electric vehicle, a signal (a second current limiting signal) IBL, which is a signal for limiting the magnitude of an electric current, a signal VBL, which is a signal for limiting the magnitude of a voltage, and the signal IBR, which is the target value of the output current, are input to the carrier-frequency setting unit 709. Besides, a signal (a first current limiting signal) IBL1 and a signal SOCL explained below are input to the carrier-frequency setting unit 709. A signal (a first control signal) FC, which is a command signal for a carrier frequency, is output from the carrier-frequency setting unit 709.

Figure 4:
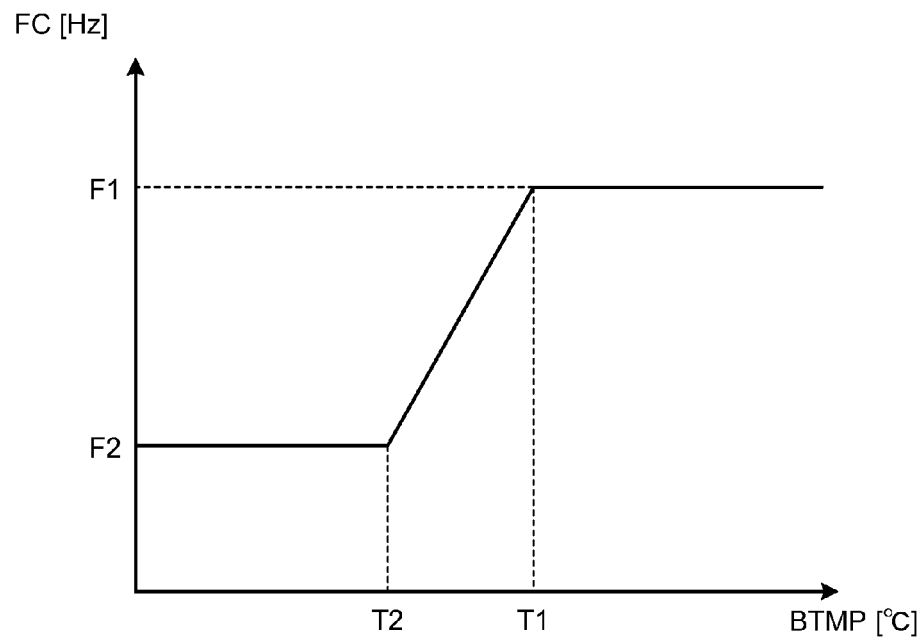
FIG. 4 is a diagram of an example of characteristics of a carrier-frequency setting unit in the first embodiment of the present invention.

Characteristics of the carrier-frequency setting unit 709 are explained. FIG. 4 is a diagram of an example of characteristics of the carrier-frequency setting unit 709 in the first embodiment of the present invention. As shown in FIG. 1, the carrier-frequency setting unit 709 is configured to generate a signal FC based on the signal BTMP. The carrier-frequency setting unit 709 has a characteristic for setting the signal FC to F1 when the signal BTMP is equal to or higher than a predetermined temperature T1 and setting the signal FC to F2 smaller than F1 when the signal BTMP is equal to or lower than a predetermined temperature T2.

Consequently, it is possible to adjust the command signal FC for a carrier frequency based on the signal BTMP equivalent to the temperature of the power storing unit 60.

The carrier-signal generating unit 74 receives the signal FC and generates and outputs the carrier signal CAR having a triangular wave or saw tooth wave shape, the frequency of which is equal to the frequency of the signal FC. The PWM-pulse generating unit 73 performs comparison of the magnitudes of the signal VREF and the carrier signal CAR. When VREF>CAR, the PWM-pulse generating unit 73 outputs the signal DGC for turning on the switching element 44H and turning off the switching element 44L. When VREF<CAR, the PWM-pulse generating unit 73 outputs the signal DGC for turning on the switching element 44L and turning off the switching element 44H. Therefore, when the frequency of the carrier signal CAR is reduced, the period of the carrier signal CAR increases, the frequency of the ON/OF signal to the switching elements 44H and 44L decreases, and the period of the ON/OFF signal also increases. Conversely, when the frequency of the carrier signal CAR is increased, the frequency of the ON/OFF signal to the switching elements 44H and 44L increases and the period of the ON/OFF signal decreases.

When the switching element 44H is kept on for t1 seconds (the switching element 44L is kept off), a change amount ΔIB1 of the output signal IB is represented by the following formula when the voltage of the filter capacitor 42 is represented as EFC [V], an output voltage is represented as VB [V], and an inductance value of the smoothing reactor 45 is represented as L [H]:

$$\Delta IB1=(EFC-VB)\times t1/L$$

When the switching element 44H is kept off for t2 seconds (the switching element 44L is kept on), a change amount ΔIB2 of the output current IB is represented by the following formula when the output voltage is represented as VB [V] and the inductance value of the smoothing reactor 45 is represented as L [H]:

$$\Delta IB2=VB\times t2/L$$

As explained above, when the period of the ON/OFF signal to the switching elements 44H and 44L is increased (t1 or t2 is increased), a change amount of the output current IB, i.e., the magnitude of a ripple component of the output current IB increases. When the period of the ON/OFF signal is reduced, the change amount of the output current IB, i.e., the magnitude of the ripple component of the output current IB decreases.

Therefore, if the command signal FC for the carrier frequency is reduced, it is possible to increase the magnitude of a ripple component due to switching included in the output current IB. If the command signal FC for the carrier frequency is increased, it is possible to reduce the magnitude of the ripple component due to switching included in the output current IB. That is, it is possible to change the magnitude of the ripple component included in the output current IB.

By increasing the magnitude of the ripple component included in the output current IB, even when an external system determines that charging and discharging are unnecessary and the signal IBR, which is the target value of the output current, is zero, it is possible to feed an electric current to the power storing unit 60. Consequently, it is possible to cause a loss due to an electric current on the inside of the power storing unit 60. Therefore, it is possible to raise the temperature of the power storing unit 60.

As explained above, the temperature-rise control unit 70 is configured to generate, based on the signal BTMP equivalent to the temperature of the power storing unit 60, the command signal FC for the carrier frequency for changing the magnitude of the ripple component of the output current IB. The temperature-rise control unit 70 is configured to generate the command signal FC for the carrier frequency adjusted to increase, when the signal BTMP equivalent to the temperature of the power storing unit 60 is lower than the predetermined value T2, the magnitude of the ripple component of the output current IB to be larger than the magnitude of the ripple component set when the signal BTMP equivalent to the temperature of the power storing unit 60 is higher than the predetermined value T2.

Further, the temperature-rise control unit 70 is configured to generate the command signal FC for the carrier frequency adjusted to reduce, when the signal BTMP equivalent to the temperature of the power storing unit 60 is lower than the predetermined value T2, the frequency of the ON/OFF signal DGC to the switching circuit 44 to be lower than the frequency of the ON/OFF signal DGC set when the signal BTMP equivalent to the temperature of the power storing unit 60 is higher than the predetermined value T2.

A configuration for adjusting a non-ripple component of the output current IB is explained. The non-ripple component of the output current IB is a component remaining after the ripple component due to switching is removed from the output current IB.

In general, in the secondary battery that is the power storage element included in the power storing unit 60, the magnitude of a charging current needs to be further reduced as temperature is lower. At an extremely low temperature (in general, in a range of 0° C. to −25° C.), an electric current in a charging direction is not allowed to be fed to the secondary battery. When a charging current exceeding an allowed value is fed, it is likely that the life of the secondary battery is markedly reduced and the secondary battery is damaged. To avoid such an event, a configuration for adjusting the non-ripple component of the output current IB is provided as explained below.

The signal IB, which is a detection signal of the output current, is input to the current-maximum-value detecting unit 703. The current-maximum-value detecting unit 703 picks up a maximum value including a ripple component of the magnitude of the input signal IB and outputs the maximum value as a signal IBP1 indicating a current maximum value. The signal IBP1 is input to the current-limiting-signal generating unit (1) 704.

Figure 5:
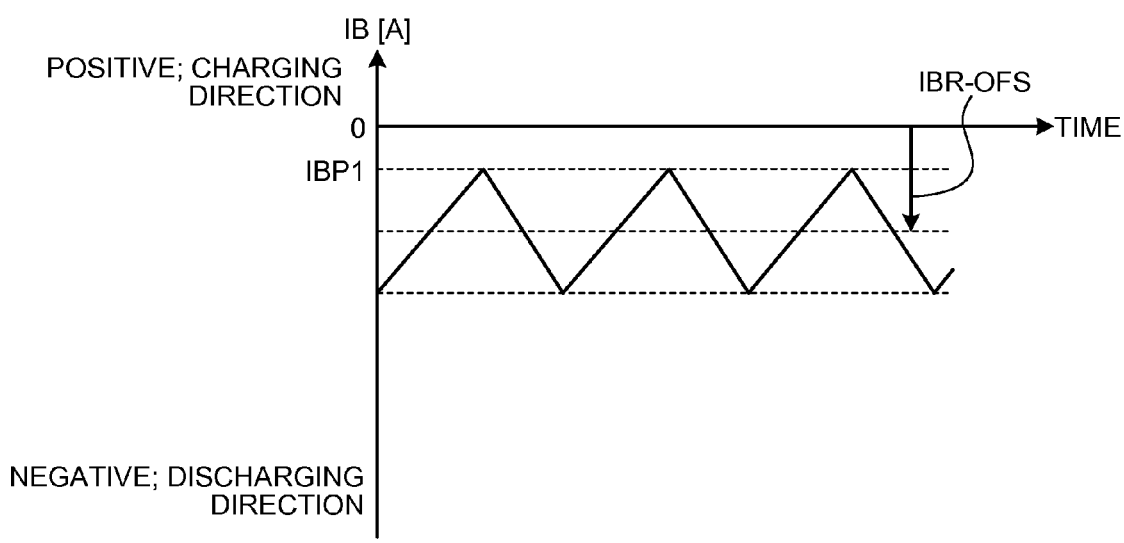
FIG. 5 is a diagram for explaining a relation between an output current IB and a signal IBPI in the first embodiment of the present invention.
Figure 6:
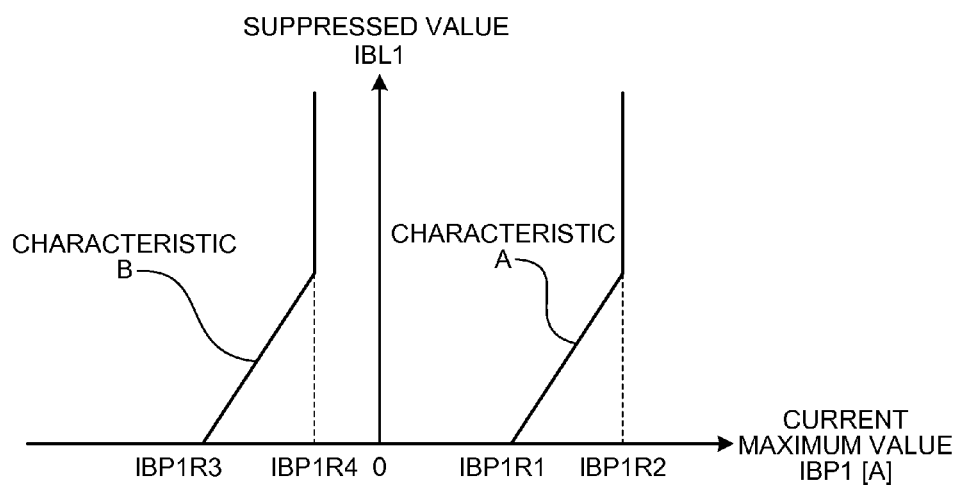
FIG. 6 is a diagram of an example of characteristics of a current-limiting-signal generating unit (1) in the first embodiment of the present invention.

FIG. 5 is a diagram for explaining a relation between the output current IB and the signal IBP1 in the first embodiment. FIG. 6 is a diagram of an example of characteristics of the current-limiting-signal generating unit (1) 704 in the first embodiment of the present invention. The current-limiting-signal generating unit (1) 704 generates, based on the signal IBP1 and the signal BTMP, a signal IBL1 for adjusting the magnitude of the non-ripple component of the output current IB and outputs the signal IBL1. The current-limiting-signal generating unit (1) 704 is configured to be capable of adjusting characteristics of the signal IBL1 based on the signal BTMP.

A characteristic A in FIG. 6 is explained. When the signal IBP1 is larger than a setting value IBP1R1, the signal IBL1 is increased. The signal IBL1 is output to the adder-subtracter 71 via the adder 701 to adjust the signal IBR from the outside to be reduced. Because the ON/OF signal DGC is generated based on the signal adjusted in this way, the output current IB can be adjusted to decrease (i.e., increase in a negative-side direction (a discharging direction). In the characteristic A, the signal IBL1 is generated and controlled such that the signal IBP1 indicating the current maximum value does not exceed a setting value (a predetermined setting value) IBP1R2. Because the current-limiting-signal generating unit (1) 704 operates in this way, it is possible to prevent the output current IB from exceeding the current value (IBP1R2) allowed according to the temperature of the power storing unit 60.

For example, when the temperature of the power storing unit 60 is an extremely low temperature and is a predetermined value at which a charging current should not be fed, by generating the signal IBL1 indicated by a characteristic B in FIG. 6, it is possible to generate the signal IBL1 adjusted such that the signal IBP1, which is the maximum value including the ripple component of the output current IB, does not increase to be larger than a setting value IBP1R4. If the setting value IBP1R4 is set to, for example, zero, it is possible to cause the current-limiting-signal generating unit (1) 704 to operate to prevent the signal IBP1 from becoming positive (on a side for charging the power storing unit 60). That is, when the power storing unit 60 is in a low temperature state in which charging is impossible, it is possible to prevent an electric current from being fed in the charging direction to the power storing unit 60.

Irrespective of a value of the signal IBR, which is the target value of the output current from the outside, it is possible to generate the signal OFS based on the signal IBL1 to eliminate the influence of the signal IBR.

That is, when the signal BTMP equivalent to the temperature of the power storing unit 60 is lower than a predetermined value, it is possible to generate the control signal OFS capable of maintaining the polarity of the output current IB including the ripple component on a side for discharging the power storing unit 60.

Consequently, it is possible to prevent a charging current exceeding the allowed value at low temperature from markedly reducing the life of the secondary battery and damaging the secondary battery.

Subsequently, the signal IB, which is the detection signal of the output current, is input to the current-maximum-value/minimum-value detecting unit 705. The current-maximum-value/minimum-value detecting unit 705 picks up a maximum value and a minimum value including the ripple component of the input signal IB and generates and outputs the signals IBP and IBN respectively indicating the maximum value and the minimum value. The signals IBP and IBN are input to the current-limiting-signal generating unit (2) 706.

Figure 7:
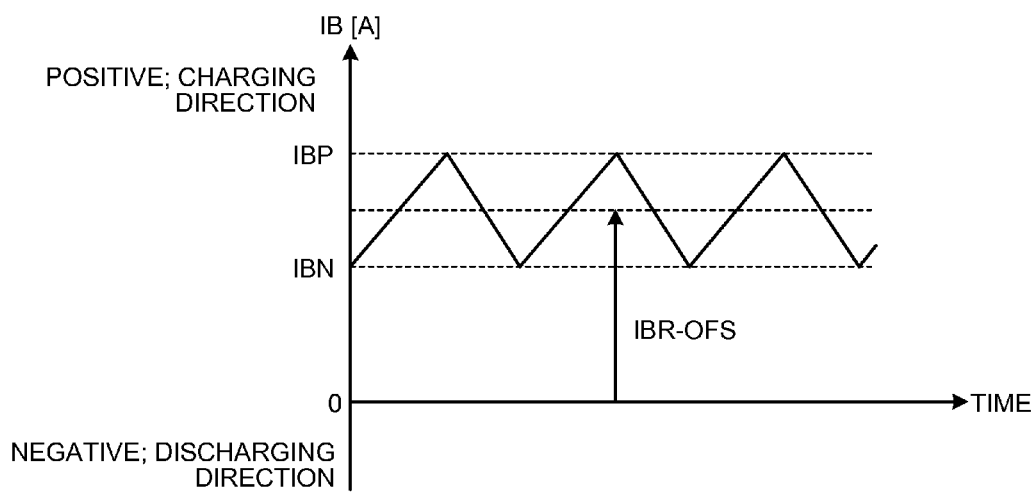
FIG. 7 is a diagram for explaining a relation between the output current IB and signals IBP and IBN in the first embodiment of the present invention.
Figure 8:
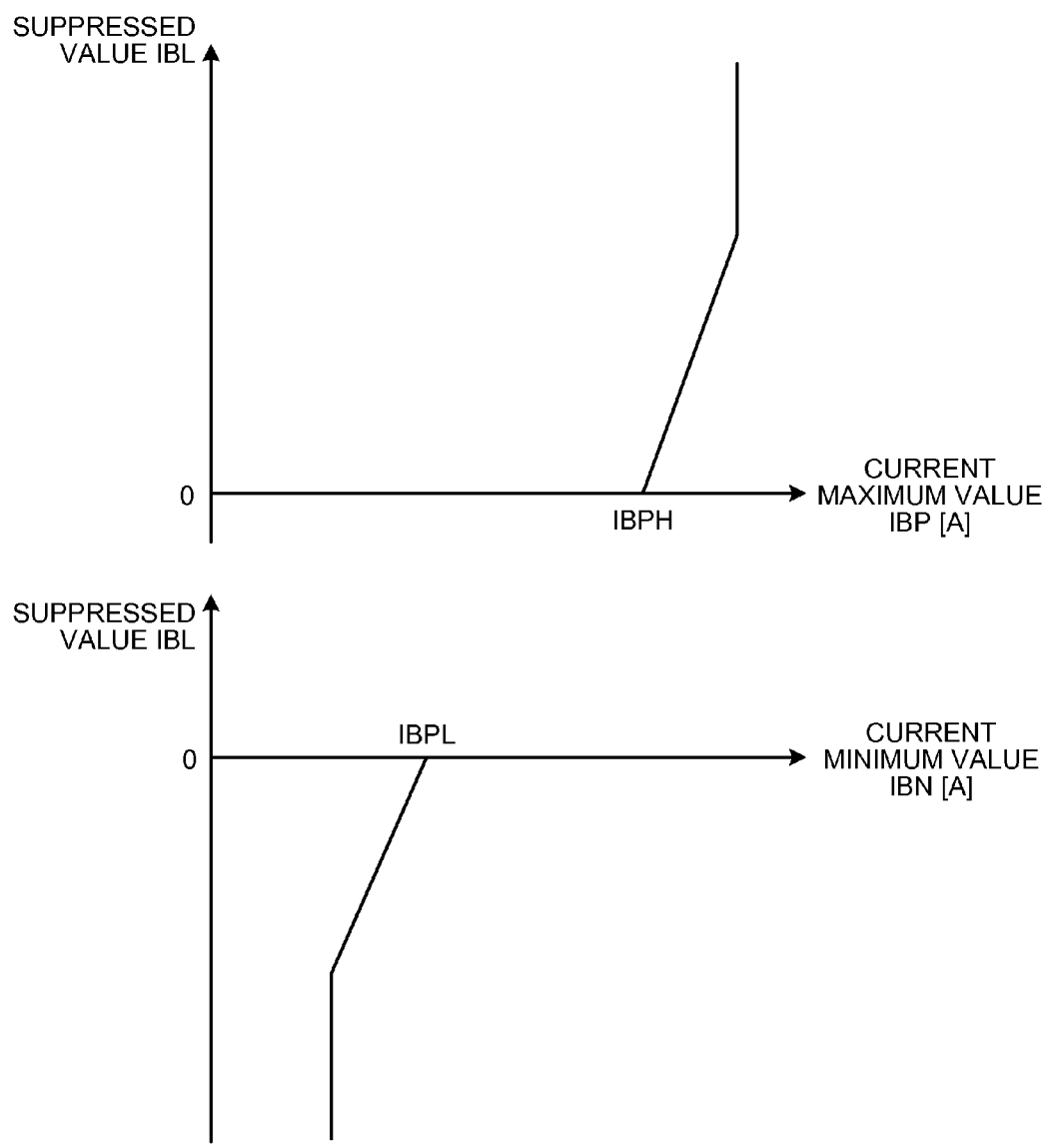
FIG. 8 is a diagram of an example of characteristics of a current-limiting-signal generating unit (2) in the first embodiment of the present invention.

FIG. 7 is a diagram for explaining a relation between the output current IB and the signals IBP and IBN in the first embodiment of the present invention. FIG. 8 is a diagram of an example of characteristics of the current-limiting-signal generating unit (2) 706 in the first embodiment of the present invention. The current-limiting-signal generating unit (2) 706 generates, based on the signal IBP and the signal IBN, a signal IBL for adjusting the magnitude of the non-ripple component of the output current IB and outputs the signal IBL.

Specifically, as shown in FIG. 8, when the signal IBP (the signal indicating the maximum value) is equal to or larger than a setting value IBPH (a first setting value), the current-limiting-signal generating unit (2) 706 increases the signal IBL (a second current limiting signal) according to the signal IBP. When the signal IBN is equal to or smaller than a setting value IBPL (a second setting value), the current-limiting-signal generating unit (2) 706 reduces the signal IBL according to the signal IBN.

The signal IBL is output to the adder-subtracter 71 via the adder 701 as the signal OFS to adjust the signal IBR from the outside. When the signal IBL is positive, i.e., when IBP, which is the maximum value of the output current IB, is equal to or larger than the setting value IBPH, the current-limiting-signal generating unit (2) 706 operates to output the signal OFS having a positive value and reduce the signal IBR, which is the target value of the output current. Conversely, when the signal IBL is negative, i.e., when IBN, which is the minimum value of the output current IB, is equal to or smaller than the setting value IBPL, the current-limiting-signal generating unit (2) 706 operates to output the signal OFS having a negative value and increase the signal IBR, which is the target value of the output current.

Because the ON/OFF signal DGC is generated based on the signal adjusted in this way, it is possible to adjust the output current IB such that the maximum value thereof is not equal to or larger than the setting value IBPH and the minimum value thereof is not equal to or smaller than the setting value IBPL. The setting values IBPH and IBPL are desirably set to be equal to or smaller than an allowable maximum current of the switching circuit 44 or set to be equal to or smaller than an allowable maximum current of the power storing unit 60.

Consequently, it is possible to prevent an electric current of the power storage element incorporated in the power storing unit 60 from exceeding an upper limit value or falling below a lower limit value to damage the power storage element. Further, it is possible to prevent the magnitude of the output current IB from exceeding an allowable maximum current of the switching element of the switching circuit 44 included in the chopper circuit to damage the switching element.

Subsequently, a signal VB, which is a detection signal of the output voltage, is input to the voltage-maximum-value/minimum-value detecting unit 707. The voltage-maximum-value/minimum-value detecting unit 707 picks up a maximum value and a minimum value including a ripple component of the magnitude of the input signal VB and generates and outputs signals VBP and VBN respectively indicating the maximum value and the minimum value. The signals VBP and VBN are input to the voltage-limiting-signal generating unit 708.

Figure 9:
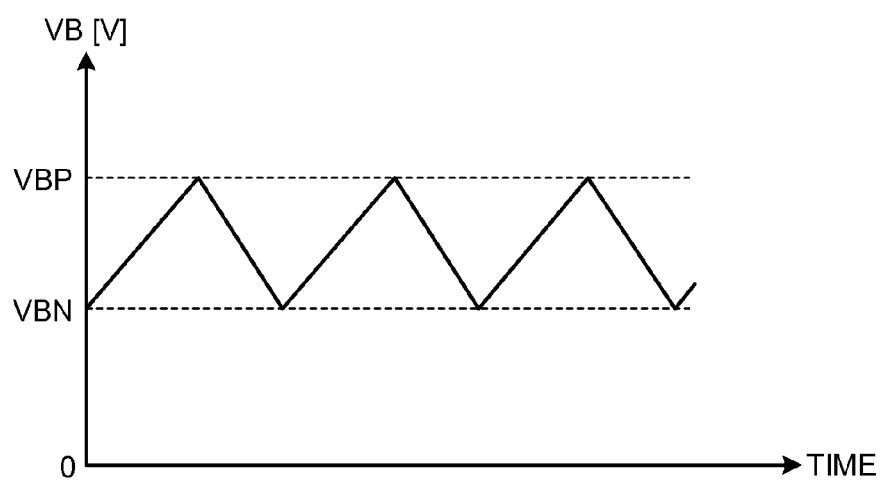
FIG. 9 is a diagram for explaining a relation between an output voltage VB and signals VBP and VBN in the first embodiment of the present invention.
Figure 10:
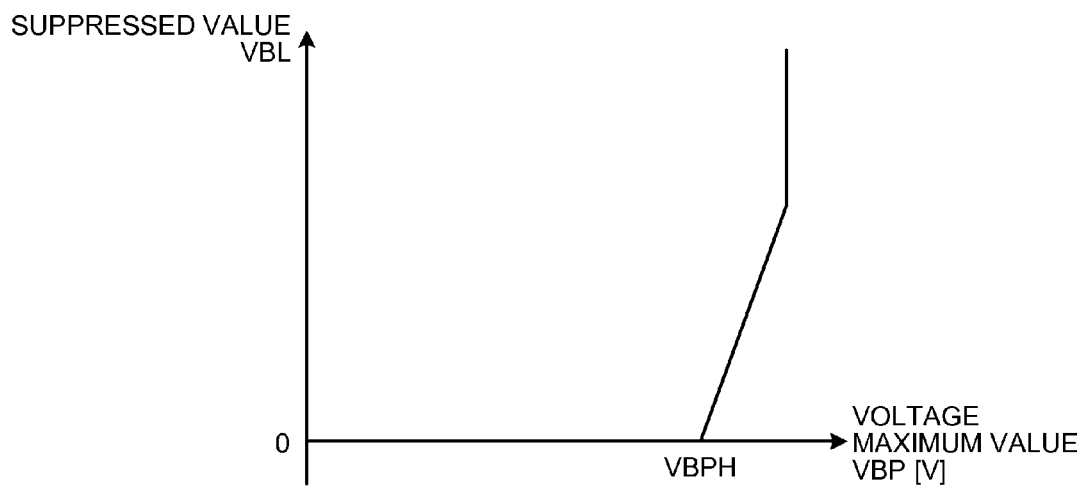
FIG. 10 is a diagram of an example of characteristics of a voltage-limiting-signal generating unit in the first embodiment of the present invention.
Figure 10:
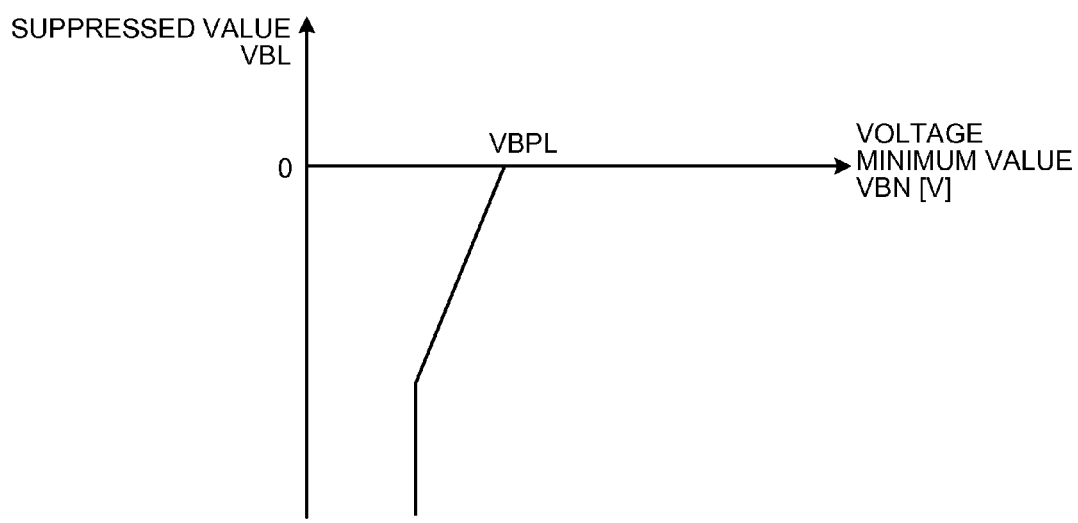

FIG. 9 is a diagram for explaining a relation between the output voltage VB and the signals VBP and VBN in the first embodiment of the present invention. FIG. 10 is a diagram of an example of characteristics of the voltage-limiting-signal generating unit 708 in the first embodiment of the present invention. The voltage-limiting-signal generating unit 708 generates, based on the signal VBP and the signal VBN, a signal VBL for adjusting the magnitude of the non-ripple component of the output current IB and outputs the signal VBL.

Specifically, as shown in FIG. 10, when the signal VBP (the signal indicating the maximum value) is equal to or larger than a setting value VBPH (a first setting value), the voltage-limiting-signal generating unit 708 increases the signal VBL according to the signal VBP. When the signal VBN is equal to or smaller than a setting value VBPL (a second setting value), the voltage-limiting-signal generating unit 708 reduces the signal VBL according to the signal VBN.

The signal VBL is output to the adder-subtracter 71 via the adder 701 as the signal OFS to adjust the signal IBR from the outside. When the signal VBL is positive, i.e., when VBP, which is the maximum value of the output voltage VB, is equal to or larger than the setting value VBPH, the voltage-limiting-signal generating unit 708 operates to output the signal OFS having a positive value and reduce the signal IBR, which is the target value of the output current. Conversely, when the signal VBL is negative, i.e., when VBN, which is the minimum value of the output voltage VB, is equal to or smaller than the setting value VBPL, the voltage-limiting-signal generating unit 708 operates to output the signal OFS having a negative value and increase the signal IBR, which is the target value of the output current.

Because the ON/OFF signal DGC is generated based on the signal adjusted in this way, it is possible to adjust the output current IB such that the maximum value of the output voltage VB is not equal to or larger than the setting value VBPH and the minimum value of the output voltage VB is not equal to or smaller than the setting value VBPL. The setting values VBPH and VBPL are desirably respectively set to be equal to or smaller than an allowable maximum voltage of the power storing unit 60 and equal to or larger than an allowable minimum voltage of the power storing unit 60.

Consequently, it is possible to prevent the voltage of the power storage element of the power storing unit 60 from exceeding the upper limit value because of an excess current or falling below the lower limit value to damage the power storage element. It is possible to prevent the magnitude of the output voltage VB from exceeding an allowable maximum voltage of the switching element of the switching circuit 44 included in the chopper circuit to damage the switching element.

Subsequently, a signal SOC indicating a charging amount of the power storing unit 60 (e.g., a signal indicating zero when the charging amount is 0% and indicating 100 when the charging amount is 100%) is input to the offset-signal generating unit 702. The offset-signal generating unit 702 generates a signal SOCL based on the input signal SOC and outputs the signal SOCL.

Figure 11:
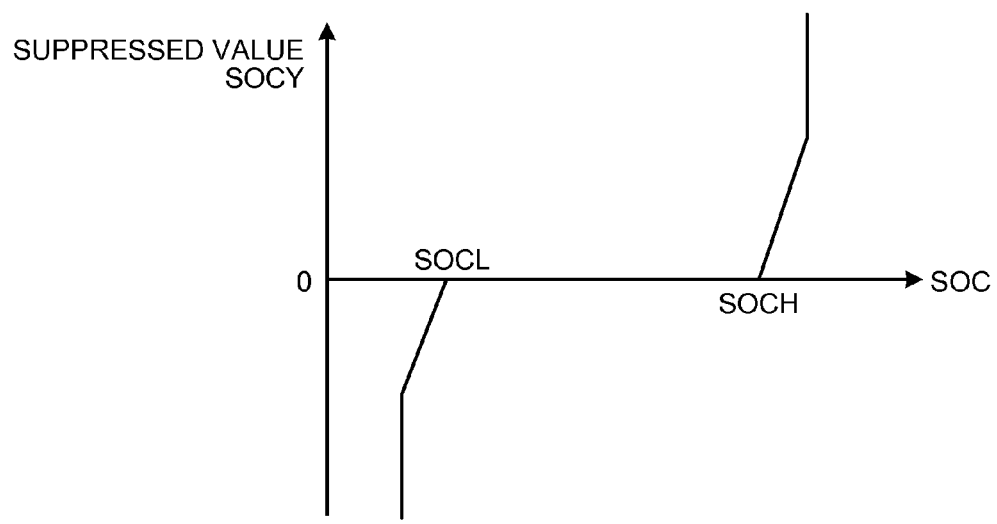
FIG. 11 is a diagram of an example of characteristics of an offset-signal generating unit in the first embodiment of the present invention.

FIG. 11 is a diagram of an example of characteristics of the offset-signal generating unit 702 in the first embodiment of the present invention. The offset-signal generating unit 702 generates, based on the signal SOC, the signal SOCL for adjusting the magnitude of the non-ripple component of the output current IB and outputs the signal SOCL.

Specifically, as shown in FIG. 11, when the signal SOC is equal to or larger than a predetermined value SOCH indicating high SOC, the offset-signal generating unit 702 increases the signal SOCL according to the signal SOC. When the signal SOC is equal to or smaller than a predetermined value SOCL indicating low SOC, the offset-signal generating unit 702 reduces the signal SOCL according to the signal SOC.

The signal SOCL is output to the adder-subtracter 71 via the adder 701 as the signal OFS to adjust the signal IBR from the outside. When the signal SOCL is positive, i.e., when a remaining amount SOC of the power storing unit 60 is equal to or larger than SOCH, which is an upper limit setting value, the offset-signal generating unit 702 operates to output the signal OFS having a positive value and reduce the signal IBR, which is the target value of the output current. Conversely, when the signal SOCL is negative, i.e., when the remaining amount SOC is equal to or smaller than SOCL, which is a lower limit setting value, the offset-signal generating unit 702 operates to output the signal OFS having a negative value and increase the signal IBR, which is the target value of the output current.

That is, when a charging amount of the power storing unit 60 is larger than the predetermined value indicating high SOC, the temperature-rise control unit 70 generates the control signal OFS capable of offsetting the non-ripple component of the output current IB to the side for discharging the power storing unit 60. When the charging amount of the power storing unit 60 is smaller than the predetermined value indicating low SOC, the temperature-rise control unit 70 generates the control signal OFS capable of offsetting the non-ripple component of the output current IB to the side for charging the power storing unit 60.

Because the ON/OFF signal DGC is generated based on the signal adjusted in this way, it is possible to adjust the output current IB such that a maximum value of the charging amount SOC is not equal to or larger than the predetermined value SOCH and a minimum value of the charging amount SOC is not equal to or smaller than the predetermined value SOCL. The predetermined values SOCH and SOCL are desirably respectively equal to or smaller than a maximum charging amount for finishing charging of the power storing unit 60 and equal to or larger than a minimum charging amount for finishing discharging of the power storing unit 60.

Consequently, it is possible to prevent over charging and over discharging of the power storage element of the power storing unit 60. Therefore, it is possible to prevent the power storage element from being damaged.

As explained above, the charging and discharging device according to the first embodiment includes the temperature-rise control unit 70 configured to output the control signals (FC, OFS) to be capable of raising the temperature of the power storing unit 60 based on at least the signal BTMP equivalent to the temperature of the power storing unit 60. The temperature-rise control unit 70 generates the first control signal (FC) and the second control signal (OFS) for making it possible to separately adjust the ripple component and the non-ripple component of the output current IB. The control unit 46 includes the component (the PWM-pulse generating unit 73) configured to generate the ON/OFF signal DGC based on the control signals (FC, OFS) and output the ON/OFF signal DGC to the switching circuit 44. Therefore, it is possible to efficiently raise the temperature of the power storing unit 60 without damaging the power storing unit 60.

In the above explanation, the configuration example for adjusting the magnitude of the non-ripple component included in the output current IB is explained. However, the temperature-rise control unit 70 can be configured to output, under a predetermined condition explained below, based on any one of the signal SOCL, the signal IBL, the signal VBL, and the signal IBL1, the command signal FC for the carrier frequency for making it possible to suppress the magnitude of the ripple component of the output current IB.

Specifically, the temperature-rise control unit 70 can be configured to operate to increase the command signal FC for the carrier frequency to be larger when the signal SOC indicating the charging amount of the power storing unit 60 is larger than the predetermined value SOCH indicating high SOC than when the signal SOC is smaller than the predetermined value SOCH and suppress the ripple component of the output current IB. Consequently, it is possible to prevent overcharging of the power storage element of the power storing unit 60. Therefore, it is possible to prevent the power storage element from being damaged.

The temperature-rise control unit 70 can be configured to operate to increase the command signal FC for the carrier frequency to be larger when the signal SOC indicating the charging amount of the power storing unit 60 is smaller than the predetermined value SOCL indicating low SOC than when the signal SOC is larger than the predetermined value SOCL and suppress the ripple component of the output current IB. Consequently, it is possible to prevent over discharging of the power storage element of the power storing unit 60. Therefore, it is possible to prevent the power storage element from being damaged.

The temperature-rise control unit 70 can be configured to generate, when the signal BTMP equivalent to the temperature of the power storing unit 60 is smaller than a predetermined value, the command signal FC for the carrier frequency and adjust the ripple component to make it possible to maintain the polarity of the output current IB including the ripple component on the side for discharging the power storing unit 60. Consequently, it is possible to prevent a charging current exceeding the allowed value under the low temperature condition from markedly reducing the life of the secondary battery and damaging the secondary battery. Further, it is possible to prevent an electric current in the charging direction from flowing under extremely low temperature.

The temperature-rise control unit 70 can be configured to increase the command signal FC for the carrier frequency and reduce the ripple component of the output current IB such that the magnitude of the output current IB including the ripple component is equal to or smaller than a predetermined value. Consequently, it is possible to prevent the magnitude of the electric current of the power storage element of the power storing unit 60 from exceeding the upper limit value to damage the power storage element. Further, it is possible to prevent the magnitude of the output current IB from exceeding the allowable maximum current of the switching element of the switching circuit 44 included in the chopper circuit to damage the switching element.

The temperature-rise control unit 70 can be configured to input the signal IBR, which is the target value of the output current, to the carrier-frequency setting unit 709. The carrier-frequency setting unit 709 can be configured to adjust the command signal FC for the carrier frequency based on the signal IBR.

For example, when the magnitude of the signal IBR is not equal to or larger than a value predicted to be necessary for maintaining the temperature of the power storing unit 60 at temperature equal to or higher than a predetermined temperature, the temperature-rise control unit 70 is caused to operate to reduce the command signal FC for the carrier frequency to increase the ripple component and maintain the temperature of the power storing unit 60.

When the magnitude of the signal IBR is equal to or larger than the value predicted to be necessary for maintaining the temperature of the power storing unit 60 at temperature equal to or higher than the predetermined temperature, the temperature-rise control unit 70 is caused to operate to increase the command signal FC for the carrier frequency to reduce the ripple component and not to excessively raise the temperature of the power storing unit 60.

Consequently, it is possible to generate, based on the signal IBR, which is the target value of the output current, the command signal FC for the carrier frequency that can generate the ripple component predicted to be necessary for maintaining the temperature of the power storing unit 60. Therefore, it is possible to prevent the temperature of the power storing unit 60 from being excessively raised.

When the charging and discharging device according to the present invention is mounted on an electric vehicle, the carrier-frequency setting unit 709 can be configured to adjust the magnitude of the command signal FC for the carrier frequency based on input speed VEL of the electric vehicle. For example, the carrier-frequency setting unit 709 is configured to increase the command signal FC for the carrier frequency to be larger than usual when the speed VEL is equal to or smaller than a predetermined value and reduce the command signal FC for the carrier frequency to be smaller than usual when the speed VEL is equal to or larger than the predetermined value. By configuring the carrier-frequency setting unit 709 in this way, when the electric vehicle is standing or traveling at low speed, it is possible to increase the command signal FC for the carrier frequency to reduce a ripple component of an electric current and reduce noise to be caused.

Second Embodiment

A second embodiment is explained. Explanation of components and functions same as those explained in the first embodiment is omitted below.

In the configuration example explained in the first embodiment, the ripple component of the electric current generated by the switching of the switching circuit 44 is used for the temperature rise of the power storing unit 60. The second embodiment is different in a configuration example in which an electric current of a time varying component (hereinafter, a rectangular wave component) is used for the temperature rise of the power storing unit 60.

Figure 12:
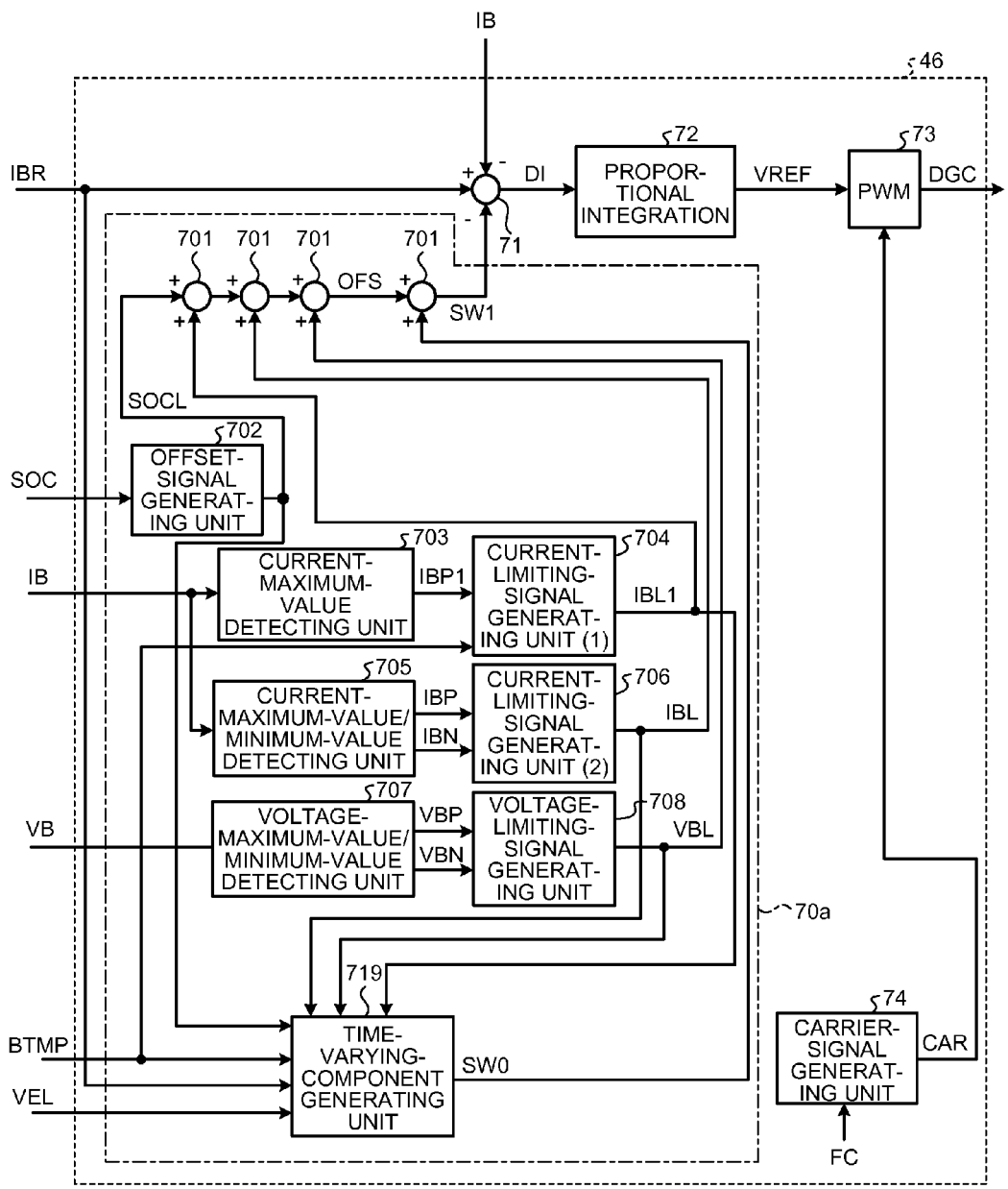
FIG. 12 is a diagram of a configuration example of a control unit in a second embodiment of the present invention.

FIG. 12 is a diagram of a configuration example of the control unit 46 in the second embodiment of the present invention. As shown in FIG. 12, the control unit 46 is different in the configuration of a temperature-rise control unit 70a. A time-varying-component generating unit 719 is provided in the temperature-rise control unit 70a. BTMP, which is a signal equivalent to the temperature of the power storing unit 60, the signal VEL equivalent to the speed of an electric vehicle, the signal IBL1, the signal IBL, the signal VBL, and the signal SOCL are input to the time-varying-component generating unit 719. The time-varying-component generating unit 719 generates and outputs a signal (a first control signal) SW0, which is a rectangular wave signal that repeats an increase and a decrease at a predetermined period. The adder 701 is configured to add up the output SW0 of the time-varying-component generating unit 719 with a signal (a second control signal) OFS by the adder 701, generate a signal (a third control signal) SW1, which is an addition result, and output the signal SW1 to the adder-subtracter 71.

Figure 13:
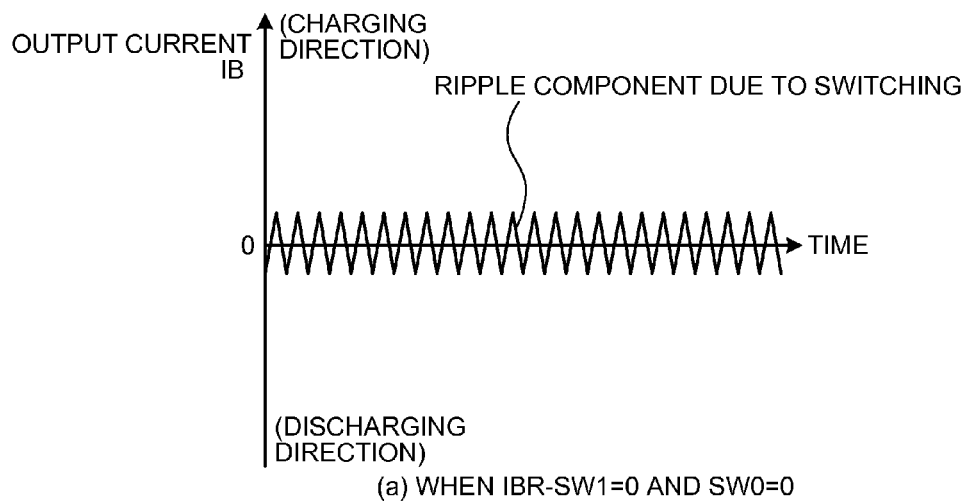
FIG. 13 is a diagram for explaining an output current waveform in the second embodiment of the present invention.
Figure 13:
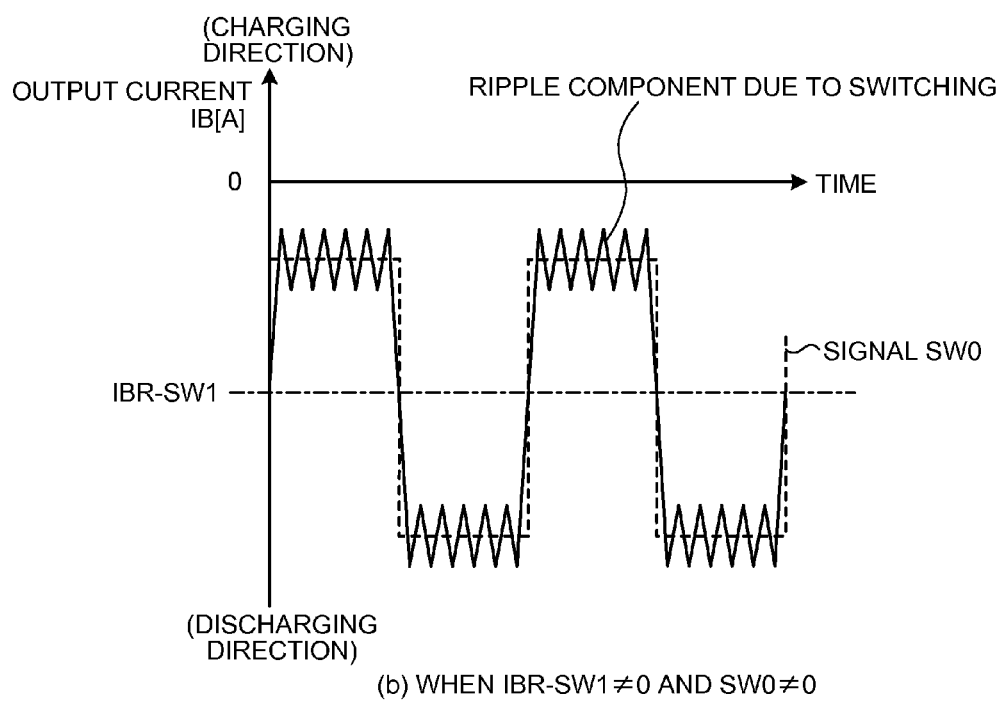

The operation of the time-varying-component generating unit 719 is explained. FIG. 13 is a diagram for explaining an output current waveform in the second embodiment of the present invention. As shown in FIG. 13, the output current IB has a waveform obtained by superimposing the signal SW0 of a rectangular wave component generated by the time-varying-component generating unit 719 on the signal IBR, which is the target value of the output current, from the outside.

By superimposing the signal SW0, which is the rectangular wave component, it is possible to obtain a value same as a time average value of the signal IBR as a time average value of the output current IB and feed a predetermined rectangular wave current component to the power storing unit 60 irrespective of the signal IBR.

The time-varying-component generating unit 719 is configured be capable of adjusting the amplitude of a rectangular wave component based on the signal BTMP. When it is indicated that the signal BTMP, i.e., the temperature of the power storing unit 60 is equal to or smaller than a predetermined value, a temperature rise of the power storing unit 60 is necessary. Therefore, the amplitude of a rectangular wave, which is the signal SW0, is increased to be larger than usual. That is, when the signal BTMP is smaller than the predetermined value, the time-varying-component generating unit 719 generates the signal SW0 for increasing the amplitude of the rectangular wave to be larger than the amplitude of the rectangular wave set when the signal BTMP is larger than the predetermined value. When the temperature of the power storing unit 60 is equal to or larger than the predetermined value, because the temperature rise of the power storing unit 60 is unnecessary, the amplitude of the rectangular wave, which is the signal SW0, is reduced or set to zero.

Concerning a component configured to be capable of adjusting a non-rectangular wave component included in the output current IB based on the signal SOCL, the signal IBL1, the signal IBL, and the signal VBL, the configuration, the operation, and the effect of the component are the same as those of the component explained in the first embodiment. Detailed explanation of the component is possible by reading "ripple component" in the explanation of the first embodiment as "rectangular wave component". Therefore, repeated explanation of the component is omitted.

Although similar to the configuration explained in the first embodiment, the temperature-rise control unit 70a can be configured to output the control signal SW1 for making it possible to suppress the magnitude of the rectangular wave component of the output current IB based on any one of the signal SOCL, the signal IBL, the signal VBL, and the signal IBL1 under a predetermined condition explained below.

Specifically, the temperature-rise control unit 70a can be configured to operate to reduce the magnitude of the rectangular wave component to be smaller when the signal SOC indicating the charging amount of the power storing unit 60 is larger than the predetermined value SOCH indicating high SOC than when the signal SOC is smaller than the predetermined value SOCH. Consequently, it is possible to prevent over charging of the power storage element of the power storing unit 60. Therefore, it is possible to prevent the power storage element from being damaged.

The temperature-rise control unit 70a can be configured to operate to reduce the magnitude of the rectangular wave component to be smaller when the signal SOC indicating the charging amount of the power storing unit 60 is smaller than the predetermined value SOCL indicating low SOC than when the signal SOC is larger than the predetermined value SOCL. Consequently, it is possible to prevent over discharging of the power storage element of the power storing unit 60. Therefore, it is possible to prevent the power storage element from being damaged.

The temperature-rise control unit 70a can be configured to adjust the magnitude of rectangular wave component to be capable of maintaining the polarity of the output current IB including the rectangular wave component to the side for discharging the power storing unit 60 when the signal BTMP equivalent to the temperature of the power storing unit 60 is smaller than a predetermined value. Consequently, it is possible to prevent a charging current exceeding the allowed value under the low temperature environment from markedly reducing the life of the secondary battery and damaging the secondary battery. Further, it is possible to prevent an electric current in the charging direction from flowing under extremely low temperature.

The temperature-rise control unit 70a can be configured to adjust (reduce) the rectangular wave component such that the magnitude of the output current IB including the rectangular wave component is equal to or smaller than a predetermined value. Consequently, it is possible to prevent the magnitude of the power storage element of the power storing unit 60 from exceeding an upper limit value to damage the power storage element. Further, it is possible to prevent the magnitude of the output current IB from exceeding the allowable maximum current of the switching element of the switching circuit 44 included in the chopper circuit to damage the switching element.

The temperature-rise control unit 70a can be configured to input the signal IBR, which is the target value of the output current, to the time-varying-component generating unit 719. The time-varying-component generating unit 719 can be configured to adjust the magnitude of the signal SW0, which is the rectangular wave component, based on the signal IBR. For example, when the magnitude of the signal IBR is not equal to or larger than a predetermined value predicted to be necessary for maintaining the temperature of the power storing unit 60 at temperature equal to or higher than a predetermined temperature, the temperature-rise control unit 70a is caused to operate to increase the magnitude of the signal SW0, which is the rectangular wave component, and maintain the temperature of the power storing unit 60. When the magnitude of the signal IBR is equal to or larger than the predetermined value predicted to be necessary for maintaining the temperature of the power storing unit 60 at temperature equal to or higher than the predetermined temperature, the temperature-rise control unit 70a is caused to operate to reduce the magnitude of the signal SW0, which is the rectangular wave component, or set the magnitude to zero to prevent the temperature of the power storing unit 60 from excessively rising. Consequently, it is possible to generate, based on the signal IBR, which is the target value of the output current, the signal SW0, which is the rectangular wave component, predicted to be necessary for maintaining the temperature of the power storing unit 60. Therefore, it is possible to reduce chances of occurrence of noise involved in the signal SW0, which is the rectangular wave component, as much as possible and prevent the temperature of the power storing unit 60 from being excessively raised.

As explained above, according to the configuration of the second embodiment, compared with the configuration for raising temperature using the ripple component explained in the first embodiment, because temperature is raised using the rectangular wave component, it is unnecessary to change the switching frequency of the switching circuit 44. Therefore, it is unlikely that the frequency of harmonic noise from the switching circuit 44 to the input side (the power supply side) fluctuates to cause a problem on the power supply side. Further, it is possible to prevent a change in a tone of electromagnetic noise from the smoothing reactor 45 and the like involved in a change in the switching frequency. Human ears feel time-varying electromagnetic noise extremely harsh. It is an advantage of the system in the second embodiment that harsh time-varying electromagnetic noise due to a temperature rise does not occur.

In the configuration of the first embodiment, to increase the magnitude of the ripple component, it is necessary to reduce the switching frequency. However, there is a disadvantage that, when the switching frequency is reduced, a high control response is not secured and control performance is deteriorated. In the configuration for raising temperature using the rectangular wave component explained in the second embodiment, because it is unnecessary to reduce the switching frequency, the control performance is not deteriorated. Therefore, it is possible to obtain a temperature raising effect without deteriorating the control performance.

When the magnitude of the ripple component is increased, there is a lower limit value of the switching frequency for preventing deterioration in the control performance. Therefore, there is a limit in possible magnitude of the ripple component. However, in the configuration for raising temperature using the rectangular wave component explained in the second embodiment of the present invention, it is possible to freely adjust the amplitude of the rectangular wave component by adjusting the magnitude of the signal SW0. Therefore, it is possible to obtain a great temperature raising effect without affecting the control performance compared with the configuration for using the ripple component.

It is desirable to set a fluctuation period of the signal SW0, which is the rectangular wave component, in a range of 1 millisecond to 1 second. In particular, when the fluctuation period is increased, a charging and discharging current amount of the power storage element due to the rectangular wave component increases and causes deterioration of the power storage element. Therefore, it is preferable not to increase the fluctuation period. It is important to set the charging and discharging current amount of the power storage element due to the rectangular wave component to a sufficiently small value (equal to or smaller than 1% in terms of SOC fluctuation).

When the charging and discharging device according to the present invention is mounted on an electric vehicle, the time-varying-component generating unit 719 can be configured to adjust the magnitude of the rectangular wave component based on input speed VEL of the electric vehicle. For example, the time-varying-component generating unit 719 is configured to reduce the magnitude of the rectangular wave component to be smaller than usual when the speed VEL is equal to or smaller than a predetermined value and increase the magnitude of the rectangular wave component to be larger than usual when the speed VEL is equal to or larger than the predetermined value. By configuring the time-varying-component generating unit 719 in this way, when the electric vehicle is standing or traveling at low speed, it is possible to reduce the magnitude of the rectangular wave component to reduce noise to be caused.

In the second embodiment, the signal SW0 is explained as being the rectangular wave component. This is because a rectangular wave is a waveform that is easily generated. Naturally, the signal SW0 can be a time varying component such as a sine wave, a triangular wave, or a saw tooth wave other than the rectangular wave component. The effect explained in the second embodiment can also be obtained by such waveforms. However, the waveforms of the time varying component are generated according to current control by the switching circuit 44. Therefore, the period of the waveform of the time varying component needs to be longer than the switching period of the switching circuit 44. Practically, it is desirable to set the period of the waveform to a period three or more times as large as the switching period.

Third Embodiment

A third embodiment is explained. Explanation of components same as those in the first and second embodiments is omitted below.

The third embodiment is different in that, as an example, a power storing unit 60a including a plurality of banks is connected to a charging and discharging device.

Figure 14:
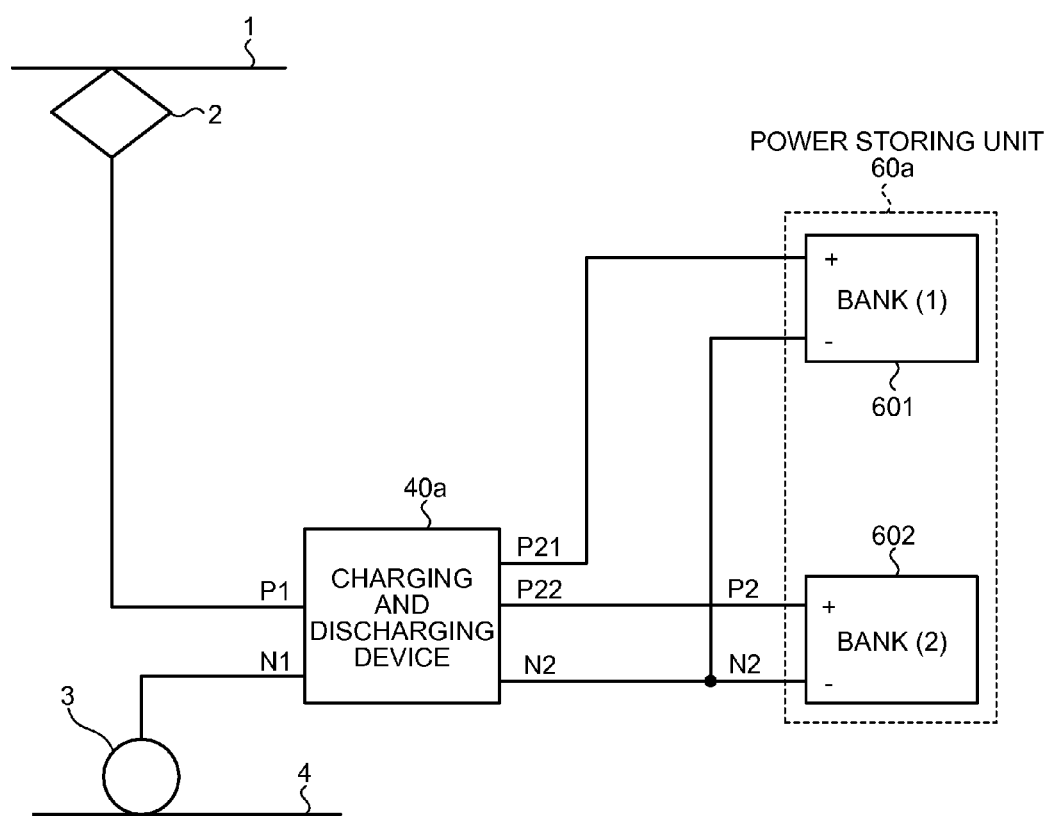
FIG. 14 is a diagram of a configuration example of a system including a charging and discharging device in a third embodiment of the present invention.

FIG. 14 is a diagram of a configuration example of a system including a charging and discharging device 40a in the third embodiment of the present invention. As shown in FIG. 14, as outputs of the charging and discharging device 40a, there are two systems, i.e., a system including P21 and N2 and a system including P22 and N2. The outputs are respectively connected to a bank (1) 601 and a bank (2) 602 of the power storing unit 60a. Power storage elements connected in series and parallel are respectively incorporated on the insides of the bank (1) 601 and the bank (2) 602. The other components are the same as those explained in the first embodiment.

Figure 15:
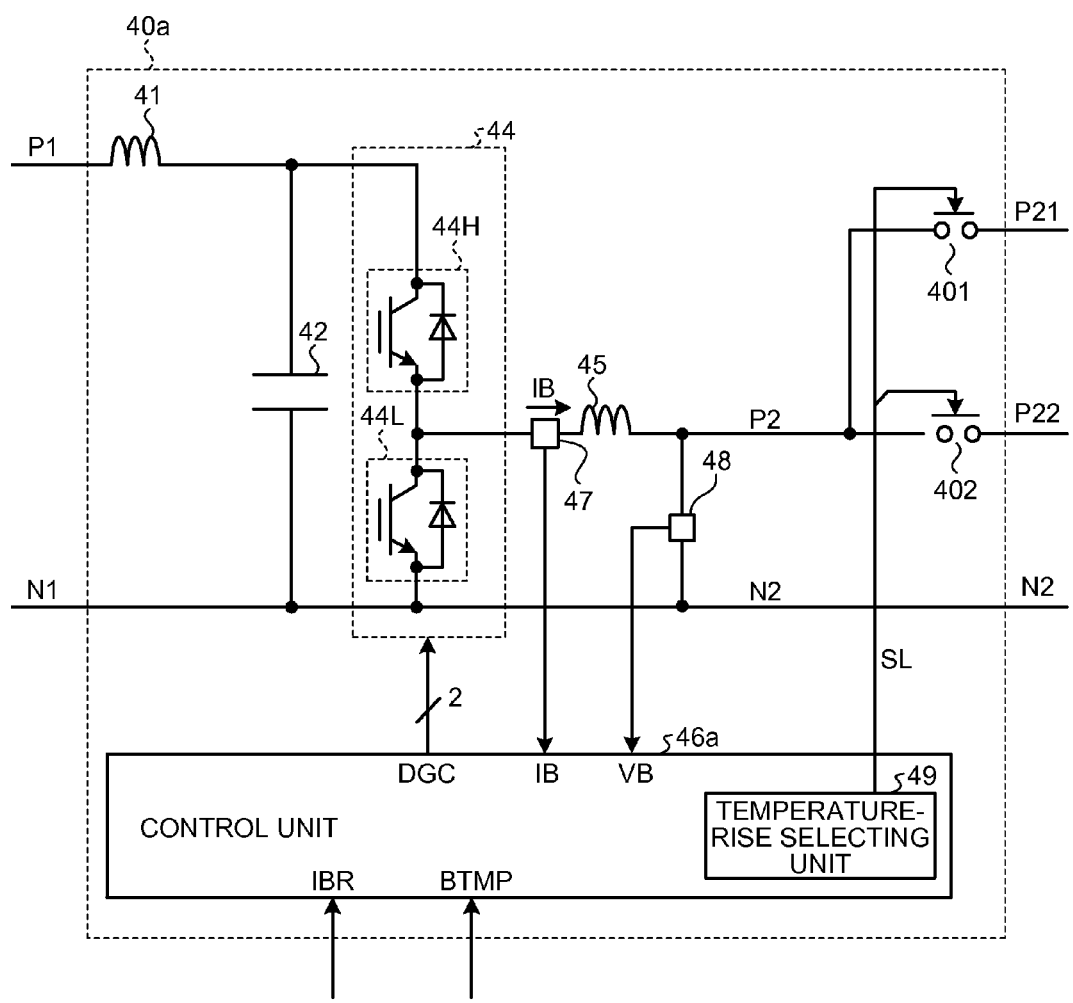
FIG. 15 is a diagram of a configuration example of the charging and discharging device in the third embodiment of the present invention.

FIG. 15 is a diagram of a configuration example of the charging and discharging device 40a in the third embodiment of the present invention. As shown in FIG. 15, the post stage of the voltage detector 48 is divided into two systems. A P21 line is output via an opening and closing unit 401 and a P22 line is output via an opening and closing unit 402. Each of the opening and closing unit 401 and the opening and closing unit 402 are controlled to an ON state or an OFF state based on a signal SL, which is a selection control signal, output from the temperature-rise selecting unit 49. The other components are the same as those explained in the first embodiment.

Figure 16:
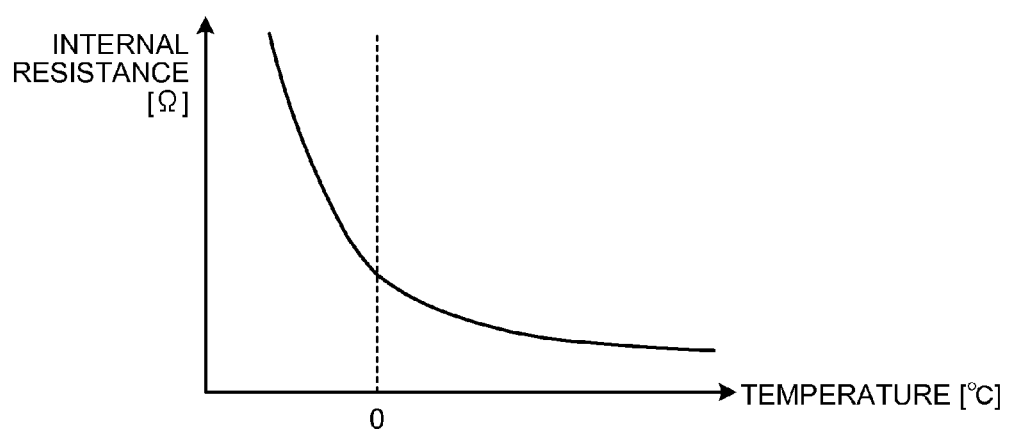
FIG. 16 is a diagram of an example of an internal resistance characteristic with respect to the temperature of a power storage element.

FIG. 16 is a diagram of an example of an internal resistance characteristic with respect to the temperature of the power storage element. As shown in FIG. 16, as a characteristic of the power storage element, there is the characteristic that internal resistance increases as temperature is lower as explained above. A rate of increase in the internal resistance increases as the temperature is lower. Therefore, when the power storing unit 60 includes a plurality of banks, if the temperatures of the banks fluctuate, a difference occurs in internal resistance of each of the banks. A rate of increase in the internal resistance is larger as the temperature of the power storage element is lower. Therefore, under low temperature, a difference among the internal resistances of the banks is large even if a difference among the temperatures of the banks is small (in several ° C. order). This point needs to be taken into account when the temperature rise control explained in the first and second embodiments is performed.

More specifically, when electric currents are collectively fed to the banks and the temperature rise control is carried out in a state in which the banks are kept connected in parallel, the electric currents less easily flow to the banks on a relatively low temperature side because the internal resistances are large. The electric currents easily flow to the banks having relatively high temperature because the internal resistances are small. In this way, imbalance of the electric current for each of the banks occurs because of a slight temperature difference among the banks. That is, imbalance of an internal loss of each of the banks occurs. Consequently, inconvenience is caused because a temperature rise of the banks on the relative low temperature side, where necessity for raising the temperature is high, is small and a temperature rise of the banks on the relatively high temperature side is large.

To eliminate such a phenomenon, the opening and closing units 401 and 402 are provided between the switching circuit 44 and the banks. The charging and discharging device 40a is configured to be capable of subjecting the opening and closing units 401 and 402 based on a control command SL from the temperature-rise selecting unit 49. As a control method, for a certain predetermined time, first, the opening and closing unit 401 is turned on and the opening and closing unit 402 is turned off to energize only the bank (1) 601. After the temperature of the bank (1) 601 reaches a predetermined temperature, for a certain predetermined time, the opening and closing unit 401 is turned off and the opening and closing unit 402 is turned on to energize only the bank (2) 602. Consequently, it is possible to separately adjust energizing currents to the banks. Therefore, it is possible to eliminate the imbalance of the temperature rises of the banks.

It is desirable to adopt a configuration explained below in common to the first, second, and third embodiments.

The signal BTMP equivalent to the temperature of the power storing unit 60 is desirably the temperature of a connection conductor that connects a plurality of power storage elements incorporated in the power storing unit 60. It is known that, in surface temperature of the power storage element, a time delay occurs with respect to an internal temperature change of the power storage element and a temperature gradient occurs. The connection conductor is connected to the inside of the power storage element by a conductor having a high heat transfer property. It is possible to accurately detect internal temperature of the power storage element without delay. Therefore, it is possible to accurately execute the temperature rise control.

The signal BTMP equivalent to the temperature of the power storing unit 60 is desirably a minimum value selected out of temperatures of connection conductors connecting the power storage elements incorporated in the power storing unit 60. The temperature less easily rises because internal resistance is larger and an electric current less easily flows in the power storage element having lower temperature. Therefore, it is possible to efficiently raise the temperature of the power storage element having lower temperature by carrying out the temperature rise control based on a minimum value among the temperatures of a plurality of connection conductors.

Further, the temperature-rise control units 70 and 70a are desirably configured to generate, based on a switching signal from a not-shown outside, the signal FC, the signal OFS, and the signal SW1, which are control signals adjusted to be capable of forcibly raising the temperature of the power storing unit 60, and output the signals. Consequently, even in a state in which the temperature rise control is not automatically performed under an environment in which the temperature of the power storing unit 60 does not fall to low temperature such as summer, the temperature-rise control units 70 and 70a are useful because it is possible to check whether the temperature-rise control normally operates.

The chopper circuit to which a direct current is input is explained as an example of the switching circuit 44. However, the switching circuit 44 can be other circuits. For example, the present invention can also be applied when the switching circuit 44 is a converter circuit to which an alternating current is input. That is, the configuration of the switching circuit 44 can be any configuration.

The configurations explained in the embodiments indicate examples of the contents of the present invention. It goes without saying that the configurations can be combined with other publicly-known technologies and can be configured to be changed by, for example, omitting a part thereof without departing from the spirit of the present invention.

INDUSTRIAL APPLICABILITY

As explained above, the present invention can be applied to the charging and discharging device that performs charging and discharging of the power storing unit including the power storage element such as a secondary battery or an electric double layer capacitor and is, in particular, suitable as an invention for making it possible to efficiently raise the temperature of the power storing unit including the power storage elements.

REFERENCE SIGNS LIST

1 Overhead line
2 Current collecting device
3 Wheel
4 Rail
40, 40a Charging and discharging devices
401, 402 Opening and closing units
41 Reactor
42 Filter capacitor
44 Switching circuit
44H, 44L Switching elements
45 Smoothing reactor
46, 46a Control units
47 Current detector
48 Voltage detector
49 Temperature-rise selecting unit
60, 60a Power storing units
601, 602 Bank (1), Bank (2)
70, 70a Temperature-rise control units
71 Adder-subtracter
72 Proportional integration controller
73 PWM-pulse generating unit
74 Carrier-signal generating unit
701 Adder
702 Offset-signal generating unit
703 Current-maximum-value detecting unit
704 Current-limiting-signal generating unit (1) (First current-limiting-signal generating unit)
705 Current-maximum-value/minimum-value detecting unit
706 Current-limiting-signal generating unit (2) (Second current-limiting-signal generating unit)
707 Voltage-maximum-value/minimum-value detecting unit
708 Voltage-limiting-signal generating unit
709 Carrier-frequency setting unit
719 Time-varying-component generating unit
BTMP Signal equivalent to temperature on the inside of a power storing unit
CAR Carrier signal
DGC ON/OFF signal
IB Output current (Detection signal of an output current)
IBR Signal, which is a target value (a command value) of an output current
IBL Second current limiting signal
IBL1 First current limiting signal
IBPH, VBPH Setting values (First setting values)
IBPL, VBPL Setting values (Second setting values)
FC Control signal (First control signal)
OFS Control signal (Second control signal)
SW1 Control signal (Third control signal)
SOCH Upper limit value of SOC (Predetermined value)
SOCL Lower limit value of SOC (Predetermined value)
SW0 Rectangular wave signal (First control signal)
T2 Predetermined temperature
VB Output voltage (Detection signal of an output voltage)
VBL Voltage limiting signal
VEL Signal equivalent to speed
VREF Signal subjected to proportional integration processing

The invention claimed is:

1. A charging and discharging device mounted on an electric vehicle, the charging and discharging device comprising:
a switching circuit, an input of which is connected to a power supply, the switching circuit adjusting an output current to a power storing unit connected to an output of the switching circuit; and
a control unit configured to generate an ON/OFF signal to the switching circuit, wherein
the control unit includes a temperature-rise control unit configured to generate, based on a signal equivalent to a temperature of the power storing unit and a signal equivalent to speed of the electric vehicle, a control signal for adjusting a ripple component of the output current or a control signal for adjusting a time varying component of the output current, the control unit generating the ON/OFF signal based on the control signal and outputting the ON/OFF signal to the switching circuit, wherein
the temperature-rise control unit comprises at least one of:
a current-limiting-signal generating unit configured to generate a current limiting signal for adjusting magnitude of a non-ripple component of the output current, based on a maximum value and a minimum value of the output current including a ripple component of a detection signal of the output current; and
a voltage limiting signal for adjusting magnitude of the non-ripple component of the output current, based on a maximum value and a minimum value of an output voltage including a ripple component of a detection signal of the output voltage.

2. A charging and discharging device comprising:
a switching circuit, an input of which is connected to a power supply, the switching circuit adjusting an output current to a power storing unit connected to an output of the switching circuit; and
a control unit configured to generate an ON/OFF signal to the switching circuit,
the control unit including a temperature-rise control unit configured to output, based on a signal equivalent to a temperature of the power storing unit, a control signal for adjusting a ripple component of the output current or a control signal for adjusting a time varying component of the output current, and the control unit generating the ON/OFF signal based on the control signal and outputting the ON/OFF signal to the switching circuit, wherein
the power storing unit includes a plurality of banks formed by combining an arbitrary plurality of power storage elements,
a plurality of opening and closing units respectively connected to the plurality of banks and capable of connecting and disconnecting the switching circuit to selectively connect two or more of the plurality of banks and the switching circuit, and
the control unit includes a temperature-rise selecting unit configured to output, to the opening and closing units, a selection control signal for connecting a predetermined two of the banks to the switching circuit and enabling temperature-rise control; and
the temperature-rise control unit comprises at least one of:
a current-limiting-signal generating unit configured to generate a current limiting signal for adjusting magnitude of a non-ripple component of the output current, based on a maximum value and a minimum value of the output current including a ripple component of a detection signal of the output current, and a voltage limiting signal for adjusting magnitude of the non-ripple component of the output current, based on a maximum value and a minimum value of an output voltage including a ripple component of a detection signal of the output voltage.

3. A charging and discharging device comprising:
a switching circuit, an input of which is connected to a power supply, the switching circuit adjusting an output current to a power storing unit connected to an output of the switching circuit; and
a control unit configured to generate an ON/OFF signal to the switching circuit, wherein
the control unit includes:
  a temperature-rise control unit configured to separately generate, based on at least a signal equivalent to a temperature of the power storing unit, a first control signal for varying a magnitude of a ripple component of the output current to raise the temperature of the power storing unit and a second control signal for varying a magnitude of a non-ripple component of the output current,
  wherein the temperature-rise control unit includes a current-limiting-signal generating unit configured to generate a current limiting signal for adjusting magnitude of the non-ripple component of the output current, based on a maximum value and a minimum value of the output current including a ripple component of a detection signal of the output current; and
  a PWM-pulse generating unit configured to generate the ON/OFF signal based on the first control signal and the second control signal and outputting the ON/OFF signal to the switching circuit.

4. The charging and discharging device according to claim 3, wherein the temperature-rise control unit includes a carrier-frequency setting unit configured to generate the first control signal based on at least the signal equivalent to the temperature of the power storing unit.

5. The charging and discharging device according to claim 3, wherein the temperature-rise control unit includes an offset-signal generating unit configured to generate an offset signal for offsetting a non-ripple component of the output current to a side for discharging the power storing unit, based on a signal indicating a charging amount of the power storing unit is larger than a predetermined value.

6. The charging and discharging device according to claim 3, wherein the temperature-rise control unit includes an offset-signal generating unit configured to generate an offset signal for offsetting a non-ripple component of the output current to a side for charging the power storing unit, based on a signal indicating a charging amount of the power storing unit is smaller than a predetermined value.

7. The charging and discharging device according to claim 3, wherein the temperature-rise control unit includes a voltage-limiting-signal generating unit configured to generate a voltage limiting signal for adjusting magnitude of the non-ripple component of the output current, based on a maximum value and a minimum value of an output voltage including a ripple component of a detection signal of the output voltage.

8. The charging and discharging device according to claim 3, wherein the temperature-rise control unit generates the first control signal for maintaining polarity of the output current including the ripple component on a side for discharging the power storing unit, when the signal equivalent to the temperature of the power storing unit is smaller than a predetermined value.

9. The charging and discharging device according to claim 3, wherein the temperature-rise control unit generates the first control signal and the second control signal to reduce the magnitude of the output current including the ripple component to be equal to or smaller than a predetermined value.

10. The charging and discharging device according to claim 3, wherein the temperature-rise control unit adjusts magnitude of the ripple component based on a command value of the output current.

11. The charging and discharging device according to claim 3, wherein the temperature-rise control unit forcibly outputs the first control signal or the second control signal based on a switching signal received from an external source.

12. A charging and discharging device comprising:
a switching circuit, an input of which is connected to a power supply, the switching circuit adjusting an output current to a power storing unit connected to an output of the switching circuit; and
a control unit configured to generate an ON/OFF signal to the switching circuit, wherein
the control unit includes:
  a temperature-rise control unit configured to separately generate, based on at least a signal equivalent to a temperature of the power storing unit, a first control signal for varying a magnitude of a ripple component of the output current to raise the temperature of the power storing unit and a second control signal for varying a magnitude of a non-ripple component of the output current,
  wherein the temperature-rise control unit includes a voltage-limiting-signal generating unit configured to generate a voltage limiting signal for adjusting magnitude of the non-ripple component of the output current, based on a maximum value and a minimum value of an output voltage including a ripple component of a detection signal of the output voltage; and
  a PWM-pulse generating unit configured to generate the ON/OFF signal based on the first control signal and the second control signal and outputting the ON/OFF signal to the switching circuit.

13. The charging and discharging device according to claim 12, wherein the temperature-rise control unit includes a carrier-frequency setting unit configured to generate the first control signal based on at least the signal equivalent to the temperature of the power storing unit.

14. The charging and discharging device according to claim 12, wherein the temperature-rise control unit includes an offset-signal generating unit configured to generate an offset signal for offsetting a non-ripple component of the output current to a side for discharging the power storing unit, based on a signal indicating a charging amount of the power storing unit is larger than a predetermined value.

15. The charging and discharging device according to claim 12, wherein the temperature-rise control unit includes an offset-signal generating unit configured to generate an offset signal for offsetting a non-ripple component of the output current to a side for charging the power storing unit, based on a signal indicating a charging amount of the power storing unit is smaller than a predetermined value.

16. The charging and discharging device according to claim 12, wherein the temperature-rise control unit generates the first control signal for maintaining polarity of the output current including the ripple component on a side for discharging the power storing unit, when the signal equivalent to the temperature of the power storing unit is smaller than a predetermined value.

17. The charging and discharging device according to claim 12, wherein the temperature-rise control unit generates the first control signal and the second control signal to reduce the magnitude of the output current including the ripple component to be equal to or smaller than a predetermined value.

18. The charging and discharging device according to claim 12, wherein the temperature-rise control unit adjusts magnitude of the ripple component based on a command value of the output current.

19. The charging and discharging device according to claim 12, wherein the temperature-rise control unit forcibly outputs the first control signal or the second control signal based on a switching signal received from an external source.

* * * * *